(12) United States Patent
Terrel et al.

(10) Patent No.: US 8,300,231 B2
(45) Date of Patent: Oct. 30, 2012

(54) SYSTEM AND METHOD FOR USING SLOW LIGHT IN OPTICAL SENSORS

(75) Inventors: Matthew A. Terrel, Los Altos, CA (US); Michel J. F. Digonnet, Palo Alto, CA (US); Shanhui Fan, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 13/026,049

(22) Filed: Feb. 11, 2011

(65) Prior Publication Data

US 2011/0134432 A1 Jun. 9, 2011

Related U.S. Application Data

(62) Division of application No. 12/139,169, filed on Jun. 13, 2008, now Pat. No. 7,911,622.

(60) Provisional application No. 60/944,396, filed on Jun. 15, 2007.

(51) Int. Cl.
*G01B 9/02* (2006.01)
(52) U.S. Cl. ...................................................... 356/477
(58) Field of Classification Search .................. 356/477, 356/482, 483, 486, 493, 498, 459–461
See application file for complete search history.

(56) References Cited

U.S. PATENT DOCUMENTS

| 4,273,445 A | 6/1981 | Thompson et al. |
| 6,246,048 B1 | 6/2001 | Ramos et al. |
| 6,917,431 B2 | 7/2005 | Soljacic et al. |
| 7,116,864 B2 | 10/2006 | Yanik et al. |
| 7,385,177 B2 | 6/2008 | Steinberg et al. |
| 7,911,622 B2 | 3/2011 | Terrel et al. |
| 8,068,232 B2 | 11/2011 | Terrel et al. |
| 2006/0164648 A1* | 7/2006 | Howard ........................ 356/450 |
| 2007/0242276 A1* | 10/2007 | Hughes et al. ................ 356/461 |
| 2009/0027754 A1 | 1/2009 | Steinberg et al. |
| 2011/0001981 A1 | 1/2011 | Digonnet |

FOREIGN PATENT DOCUMENTS

EP 1391693 2/2004

(Continued)

OTHER PUBLICATIONS

Arditty et al., Sagnac effect in fiber gyroscopes, Optics Letters, 1981, vol. 6, Issue 8, pp. 401-403.

(Continued)

*Primary Examiner* — Tarifur Chowdhury
*Assistant Examiner* — Jonathon Cook
(74) *Attorney, Agent, or Firm* — Knobbe, Martens, Olson & Bear LLP

(57) ABSTRACT

An optical sensor includes at least one optical coupler and an optical waveguide in optical communication with the at least one optical coupler. The optical waveguide is configured to receive a first optical signal from the at least one optical coupler. The first optical signal has a group velocity and a phase velocity while propagating through at least a portion of the optical waveguide, the group velocity less than the phase velocity. An interference between the first optical signal and a second optical signal is affected by relative movement between the optical waveguide and the at least one optical coupler.

31 Claims, 17 Drawing Sheets

FOREIGN PATENT DOCUMENTS

| EP | 2 259 037 | 12/2010 |
|---|---|---|
| WO | WO 2008/157405 | 12/2008 |

OTHER PUBLICATIONS

Chow, J.H. et al., Phase-sensitive interrogation of fiber Bragg grating resonators for sensing applications, J. Lightwave Technol., May 2005, vol. 23, Issue 5, pp. 1881-1889.

Dangui et al., Phase sensitivity to temperature of the fundamental mode in air-guiding photonic-bandgap fibers, Optics Express, 2005, vol. 13, Issue 18, pp. 6669-6684.

Deladi et al., Carving fiber-top optomechanical transducers from an optical fiber, Journal of Micromechanics and Microengineering, 2006, vol. 16, pp. 886-889.

Erdogan, T., Fiber grating spectra, J. of Lightwave Technology, 1997, vol. 15.

Examination Report dated Aug. 3, 2010, for European Application No. 08771079.4.

Gatti, D. et al., Fiber strain sensor based on a π-phase-shifted Bragg grating and the Pound-Drever-Hall technique, Optics Express, Feb. 4, 2008, vol. 16, Issue 3, pp. 1945-1950.

Grudinin et al., Ultrahigh optical Q factors of crystalline resonators in the linear regime, Phys. Rev. A 74, 063806, 2006.

Harris, Stephen, Electromagnetically induced transparency, Physics Today, 1997, pp. 36-42.

Hocker, G.B., Fiber-optic sensing of pressure and temperature, Applied Optics, 1979, vol. 18, Issue 9, pp. 1445-1459.

Hoo et al., Evenescent-wave gas sensing using microstructure fiber, Optical Engineering, 2002, vol. 41(1), pp. 8-9.

International Search Report and Written Opinion for Application No. PCT/US2008/066986 dated Dec. 2, 2008.

Johlen, D. et al., UV-induced absorption, scattering and transition losses in UV side-written fibers, Optical Fiber Communication Conference and the International Conference on Integrated Optics and Optical Fiber Communication, 1999 OSA Technical Digest Series (Optical Society of America, Washington, D.C.), paper ThD1, 1999, pp. 50-52.

Kersey et al., Fiber grating sensors, Journal of Lightwave Technology, 1997, vol. 15, Issue 8, pp. 1442-1463.

Kersey, A.D. et al., High resolution fibre-grating based strain sensor with interferometric wavelength-shift detection, Electronic Letters, Jan. 1992, vol. 28, Issue 3.

Koo, K.P. et al., Bragg grating-based laser sensors systems with interferometric interrogation and wavelength division multiplexing, J. Lightwave Technol., Jul. 1995, vol. 13, Issue 7.

Lee, M. et al., Improved slow-light delay performance of a broadband stimulated Brillouin scattering system using fiber Bragg gratings, Applied Optics, Dec. 1, 2008, vol. 47, Issue 34, pp. 6404-6415.

Leeb et al., Optical fiber gyroscopes: Sagnac or Fizeau effect?, Applied Optics, 1979, vol. 18, Issue 9, pp. 1293-1295.

Lefevre, The Fiber-Optic Gyroscope, Ch. 11, Artech House, 1993, Boston.

Lefevre, The Fiber-Optic Gyroscope, Ch. 2, Artech House, 1993, Boston.

Lefevre, The Fiber-Optic Gyroscope, Ch. 3, Artech House, 1993, pp. 30-43, Boston.

Lefevre, The Fiber-Optic Gyroscope, Ch. 6, Artech House, 1993, Boston.

Lemaire, P.J. et al., High pressure H2 loading as a technique for achieving ultrahigh UV photosensitivity and thermal sensitivity in GeO2 doped optical fibres, Electronic Letters, Jun. 1993, vol. 29, Issue 13.

Leonhart et al., Ultrahigh sensitivity of slow-light gyroscope, Physical Review A, 2000, vol. 62, 055801, pp. 1-2.

Lin et al., Zero dispersion slow light with low leakage loss in defect Bragg fiber, Applied Physics Letters, 2007, vol. 90, Issue 3, 031109, pp. 1-3.

Liu, Y. et al., Transmission loss of phase-shifted fiber Bragg gratings in lossy materials: a theoretical and experimental investigation, Applied Optics, 2007.

Matsko et al., Erratum to optical gyroscope with whispering gallery mode optical cavities, Optics Communications, 2006, vol. 259, pp. 393-394.

Matsko et al., Optical gyroscope with whispering gallery mode optical cavities, Optics Communications, 2004, vol. 233, pp. 107-112.

Misas, C.J. et al., Slowing of pulses to c/10 with subwatt power levels and low latency using brillouin amplification in a bismuth-oxide optical fiber, J. of Lightwave Technology, Jan. 2007, vol. 25, Issue 1.

Mok, Joe T., Dispersionless slow light using gap solitons, Nature Physics, Nov. 2006, vol. 21, pp. 775-780.

Ouellette, F. et al., Broadband and WDM dispersion compensation using chirped sample fibre Bragg gratings, Electronic Letters, May 1995, vol. 31, Issue 11.

Parker et al., A fully distributed simultaneous strain and temperature sensor using spontaneous brillouin backscatter, IEEE Photonics Technology Letters, 1997, vol. 9, Issue 7, pp. 979-981.

Pavlath, Fiber optic gyros: the vision realized, 18th International Optical Fiber Sensors Conference Technical Digest (Optical Society of America, Washington DC, 2006) MA3.

Peng et al., Optical gyroscope based on a coupled resonator with the alloptical analogous property of electromagnetically induced transparency, Optics Express, Apr. 2, 2007, vol. 15, Issue 7, pp. 3864-3875.

Peng et al., Rotation sensing based on a slow-light resonating structure with high group dispersion, Applied Optics, Jul. 2007, vol. 46, Issue 19, pp. 4125-4131.

Peng, Chao et al., "Slow light" gyroscope based on a coupled resonator waveguide structure, Poster Session 3, P79, Nano-Optoelectronics Workshop, i-NOW, 2007, pp. 232-233.

Post, E.J., Sagnac effect, Reviews of Modern Physics, 1967, vol. 39, Issue 2, pp. 475-493.

Purves, G. et al., Sagnac interferometry in a slow-light medium, Physical Review A 74, 023805, 2006, pp. 1-4.

Rao, Y.J., In-fibre Bragg grating sensors, Meas. Sci. Technol., 1997, vol. 8, pp. 355-375.

Sandhu et al., Dynamically tuned coupled-resonator delay lines can be nearly dispersion free, Optics Letters, 2006, vol. 31, Issue 13, pp. 1985-1987.

Scheuer et al., Sagnac effect in coupled-resonator slow-light waveguide structures, Phys. Rev. Lett., 2006, vol. 96, 053901.

Shahriar, M.S. et al., Ultrahigh enhancement in absolute and relative rotation sensing using fast and slow light, Physical Review A 75, 053807, 2007, pp. 1-10.

Shi, Z. et al., Enhancing the spectral sensitivity and resolution of interferometers using slow-light media, Optical Society of America, CTuT2, 2006.

Shi, Z. et al., Enhancing the spectral sensitivity and resolution of interferometers using slow-light media, Quantum Electronics and Laser Science Conference, QELS '07, IEEE, PI, May 6, 2007, pp. 1-2 (presentation of 2006 Optical Society of America publication).

Shi, Z. et al., Enhancing the spectral sensitivity of interferometers using slow-light media, Optics Letters, 2007, vol. 32, Issue 8, pp. 915-917.

Soljacic, M. et al., Photonic-crystal slow-light enhancement of nonlinear phase sensitivity, Journal of the Optical Society of America, 2002, vol. 19, Issue 9, pp. 2052-2059.

Steinberg et al., Rotation induced super structure in slow-light waveguides with mode degeneracy: optical gyroscopes with exponential sensitivity, JOSA B, May 2007, vol. 24(5), pp. 1216-1224.

Terrel et al., Performance limitation of a coupled resonant optical waveguide gyroscope, J. Lightwave Tech., 2009, vol. 27, Issue 1, pp. 47-54.

Yanik et al., Stopping and storing light coherently, Physical Review A 71, 013803, 2005, pp. 1-10.

Yanik et al., Stopping light all optically, Physical Review Letters, 2004, vol. 92, Issue 8, 183901, pp. 1-4.

Yanik et al., Stopping light in a waveguide with an all-optical analog of electromagnetically induced transparency, Physical Review Letters, 2004, vol. PRL 93, 233903, pp. 1-4.

Yariv et al., Coupled-resonator optical waveguide: a proposal and analysis, Optics Letters, 1999, vol. 24, Issue 11, pp. 711-713.

Yariv, A. et al., Optical waves in crystals: propagation and control of laser radiation, Wiley, 1984, pp. 155-214, New York.

Zimmer et al., Sagnac interferometry based on ultraslow polaritons in cold atomic vapors, Physical Review Letters, 2004, vol. 92, Issue 25, 253201, pp. 1-4.

Digonnet, M.J.F., "New technologies in fiber sensors", Lasers and Electro-Optics, 2007 and The International Quantum Electron ICS Conference on Jun. 1, 2007, 1 page.

International Report on Patentability re PCT Application No. PCT/US2008/066986, mailed Dec. 30, 2009.

International Search Report and Written Opinion re PCT Application No. PCT/US2011/050444, dated Jan. 9, 2012.

Lissak et al., Highly sensitive dynamic strain measurements by locking lasers to fiber Bragg gratings, Optics Letters, Dec. 15, 1998, vol. 23, No. 24, pp. 1930-1932.

Wen et al., "Sensing With Slow Light in fiber Bragg Gratings", IEEE Sensors Journal, vol. 12, No. 1, Jan. 2012, pp. 156-163.

Yong et al., "Research on high sensitivity optical fiber interference sensing due to slow light", Photonics and Optoelectronics, 2009 IEEE, 4 pages.

\* cited by examiner

SYSTEM AND METHOD FOR USING SLOW LIGHT IN OPTICAL SENSORS

CROSS-REFERENCE TO RELATED APPLICATIONS

This application is a divisional of U.S. patent application Ser. No. 12/139,169, filed on Jun. 13, 2008 and incorporated in its entirety by reference herein, and which claims the benefit of priority to U.S. Provisional Appl. No. 60/944,396, filed Jun. 15, 2007, which is incorporated in its entirety by reference herein.

BACKGROUND

1. Field

The present application relates generally to optical sensors, and more specifically to fiber optic sensors.

2. Description of the Related Art

Recently, a great deal of attention has been focused on greatly reducing the group velocity of light to be significantly less than the speed of light in vacuum (referred to as "slow light"). Systems such as electronically induced transparency (see, e.g., S. E. Harris, "*Electromagnetically induced transparency*," Phys. Today, Vol. 50, No. 7, 36-42 (1997)), Bragg fibers (see, e.g., C. Lin, W. Zhang, Y. Huang, and J. Peng, "*Zero dispersion slow light with low leakage loss in defect Bragg fiber*," Appl. Phys. Lett., Vol. 90, 031109 (2007)), and coupled resonator arrays (see, e.g., A. Yariv, Y. Xu, R. K. Lee and A. Scherer, "*Coupled resonator optical waveguide: a proposal and analysis*," Opt. Lett., Vol. 24, No. 11, 711-713 (1997)) have all been shown to reduce the group velocity of light by orders of magnitude. Each of these references is incorporated in its entirety by reference herein. In addition, slow light has been studied in photonic-bandgap structures. (See, e.g., M. Soljacic, S. G. Johnson, S. Fan, M. Ibansecu, E. Ippen and J. D. Joannopoulos, "*Photonic-crystal slow-light enhancement of nonlinear phase sensitivity*," J. Opt. Soc. Am. B, Vol. 19, No. 9, 2052-2059 (2002); U.S. Pat. No. 6,917,431, "*Mach-Zehnder interferometer using photonic band gap crystals*," issued on Jul. 12, 2005; U.S. Pat. No. 7,116,864, "Stopping and time reversing light in a waveguide with an all-optical system," issued on Oct. 3, 2006; M. F. Yanik and S. Fan, "*Stopping light all-optically*," Phys. Rev. Lett., Vol. 92, 083901 (2004); M. F. Yanik, W. Suh, Z. Wang, and S. Fan, "*Stopping light in a waveguide with an all-optical analogue of electromagnetic induced transparency*," Phys. Rev. Lett., Vol. 93, 233903 (2004); M. F. Yanik and S. Fan, "*Stopping and storing light coherently*," Phys. Rev. A, Vol. 71, 013803 (2005); S. Sandhu, M. L. Povinelli, M. F. Yanik, and S. Fan, "*Dynamically-tuned coupled resonator delay lines can be nearly dispersion free*," Optics Lett., Vol. 31, 1985-1987 (2006), each of which incorporated in its entirety by reference herein).

SUMMARY

In certain embodiments, an optical sensor comprises at least one optical coupler and an optical waveguide in optical communication with the at least one optical coupler. The optical waveguide is configured to receive a first optical signal from the at least one optical coupler. The first optical signal has a group velocity and a phase velocity while propagating through at least a portion of the optical waveguide, the group velocity less than the phase velocity. An interference between the first optical signal and a second optical signal is affected by relative movement between the optical waveguide and the at least one optical coupler.

In certain embodiments, an optical sensor comprises at least one optical coupler and an optical waveguide configured to receive a first optical signal and a second optical signal from the at least one optical coupler. Light propagates through at least a portion of the optical waveguide with a group velocity and a phase velocity, the group velocity less than the phase velocity. The optical waveguide is configured to move along a first direction relative to the at least one optical coupler while the first optical signal propagates through the optical waveguide in the first direction and the second optical signal propagates through the optical waveguide in a second direction generally opposite to the first direction. An interference between the first optical signal and the second optical signal is affected by movement of the optical waveguide relative to the at least one optical coupler.

In certain embodiments, an optical sensor comprises a fiber coupler configured to receive light from a light source and to transmit light to a light detector. The optical sensor further comprises a fiber coil optically coupled to the fiber coupler. At least a portion of the fiber coil comprises an optical fiber through which light propagates with a group velocity and a phase velocity, the group velocity less than the phase velocity. At least one of the fiber coil and the fiber coupler is configured to move relative to the other such that a first optical pathlength between a first portion of the fiber coil and the fiber coupler increases and a second optical pathlength between a second portion of the fiber coil and the fiber coupler decreases. A first portion of the light received by the fiber coupler from the light source propagates from the fiber coupler, through the fiber coil in a first direction, and back to the fiber coupler and a second portion of the light received by the fiber coupler from the light source propagates from the fiber coupler, through the fiber coil in a second direction opposite to the first direction, and back to the fiber coupler. The first portion of the light and the second portion of the light propagate to the light detector and interfere with one another, wherein the interference between the first portion of the light and the second portion of the light is indicative of the movement of the fiber coil relative to the fiber coupler.

In certain embodiments, a method fabricates an optical sensor having a first sensitivity to changes of a first measurand and a second sensitivity to changes of a second measurand. The method comprises providing an optical waveguide through which light is configured to propagate with a group velocity and a phase velocity, the group velocity less than the phase velocity. A first enhancement of the first sensitivity is dependent on a group index of the optical waveguide and a second enhancement of the second sensitivity is dependent on the group index. The method further comprises selecting the group index such that the first enhancement is greater than the second enhancement.

DETAILED DESCRIPTION

Figure 1:
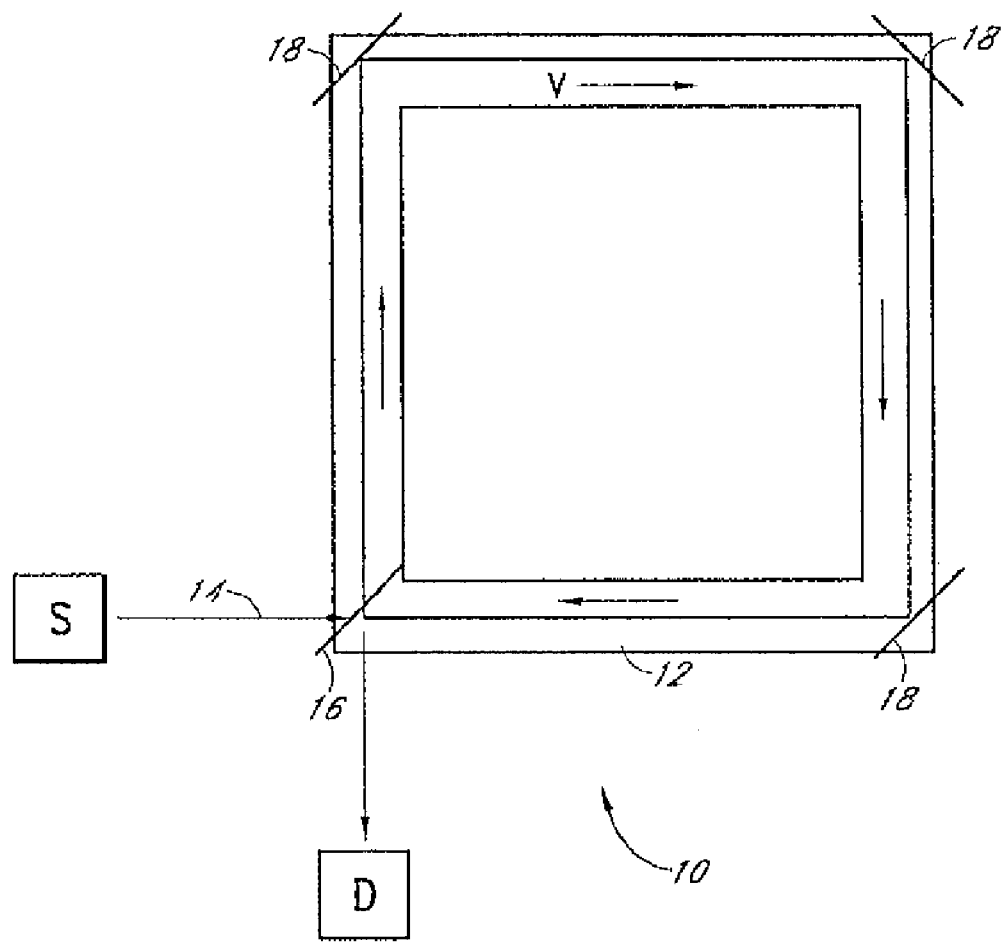
FIG. 1 schematically illustrates an interferometric fluid velocity sensor.

In some applications, the sensitivity of an optical fiber sensor is proportional to the group index of the optical fiber (or, equivalently, inversely proportional to the group velocity of light propagating through the optical fiber), which allows for greater sensitivity to be achieved when using slow light to probe the optical fiber sensor. (See, e.g., M. Soljacic, S. G. Johnson, S. Fan, M. Ibansecu, E. Ippen and J. D. Joannopoulos, "*Photonic-crystal slow-light enhancement of nonlinear phase sensitivity*," J. Opt. Soc. Am. B, Vol. 19, No. 9, 2052-2059 (2002), incorporated in its entirety by reference herein). As used herein, the term "sensitivity" has its broadest reasonable interpretation, including but not limited to, a quantity proportional to the reciprocal of the minimum detectable signal.

However, the use of slow light does not result in an enhancement of sensitivity in all optical sensors, which has led to some erroneous conclusions. (See, e.g., U. Leonhardt and P. Piwnicki, "*Ultrahigh sensitivity of slow-light gyroscope*," Phys. Rev. A, Vol. 62, 055801 (2000); G. T. Purves, C. S. Adams, and I. G. Hughes, "*Sagnac interferometry in a slow-light medium*," Phys. Rev. A, Vol. 74, 023805 (2006)).

In general, it is desirable to know which criteria a sensor must satisfy in order for its sensitivity to be enhanced by a large group index. There are yet no general recipes for slow-light enhancement of sensitivity. As described herein, a number of sensor configurations are not enhanced by slow light. Certain embodiments described herein advantageously provide specific fiber sensors and fiber sensor configurations, namely velocity, rotation, strain, and temperature sensors, whose sensitivity is increased by the use of slow light. Each description is accompanied by physical arguments supporting the sensor design and the circumstances under which slow-light enhancement is achieved.

As described herein, unless otherwise specified, the slow light is generated by using one of the existing techniques referenced above, or any technique to be developed. For example, in certain embodiments, the slow light is generated using a Bragg fiber (see, e.g., C. Lin, W. Zhang, Y. Huang, and J. Peng, "*Zero dispersion slow light with low leakage loss in defect Bragg fiber*," Appl. Phys. Lett., Vol. 90, 031109 (2007), incorporated in its entirety by reference herein) or by a photonic-bandgap fiber. In certain embodiments, the optical waveguide has a group index $n_g$ and a phase index $n_p$, and the slow light has a group velocity $v_g$ and a phase velocity $v_p$. For slow light, the group velocity $v_g$ is less than the phase velocity $v_p$. This condition can be expressed by a slow-down factor which is defined as the ratio $v_p/v_g$ or as the ratio $n_g/n_p$ and for slow light, the slow-down factor is greater than one (e.g., greater than 1.2, greater than 1.5, greater than 2, greater than 5, greater than 10, greater than 15, greater than 20). In certain embodiments, the group index $n_g$ of the material through which the slow light propagates is significantly greater than one (e.g., greater than 2, greater than 5, greater than 10, greater than 15, or greater than 20). In certain embodiments, the group velocity is less than 50% the speed of light in vacuum. In certain embodiments, the group velocity is less than 20% the speed of light in vacuum. In certain embodiments, the group velocity is less than 10% the speed of light in vacuum. In certain such embodiments, the group velocity is between one-eleventh and one-tenth the speed of light in vacuum. In certain embodiments, the group velocity is between 0.01 and 0.2 times the speed of light in vacuum.

In conventional configurations, the time delay between two counterpropagating signals in a fiber-optic gyroscope (FOG) is $\Delta t = 4A\Omega/c^2$, where A is the area of the gyro coil. This result is independent of both the group and phase index of refraction of the fiber used to make the gyro. (See, e.g., H. J. Arditty and H. C. Lefevre, "*Sagnac effect in fiber gyroscopes*," Opt. Lett., Vol. 6, No. 8, 401 (1981), incorporated in its entirety by reference herein). As such, the sensitivity to rotation of a conventional FOG cannot be improved by utilizing slow light. At least one group of authors have suggested otherwise (U. Leonhardt and P. Piwnicki, "*Ultrahigh sensitivity of slow-light gyroscope*," Phys. Rev. A, Vol. 62, 055801 (2000)), but they were subsequently proved to be wrong (F. Zimmer and M. Fleishhauer, Phys. Rev. Lett., Vol. 92, 253204 (2004), incorporated in its entirety by reference herein).

To understand the reason for this behavior, and to design configurations of rotation sensors that are enhanced by slow light, it is helpful to look into Fresnel-Fizeau drag. This effect states that the phase velocity of light traveling through a moving material depends on the velocity of the moving material, and is given by the Fresnel-Fizeau drag formula. For example, suppose that a material with an index of refraction $n(\omega)$, measured in the material's rest frame, is moving at some linear velocity v with respect to a fixed laboratory frame of reference. Light is launched into this material along a direction parallel to the vector of motion of the material, either in the same direction or in the opposite direction. In the discussion below, the angular frequency of light measured in the material's frame of reference is referred to as $\omega_m$, and the Doppler-shifted frequency of this same light measured in the laboratory frame is referred to as $\omega_L$.

There are two equivalent ways to express the phase velocity of the light signal measured in the laboratory frame $v_{ph,L}$ (see, e.g., H. J. Arditty and H. C. Lefevre, "*Sagnac effect in fiber gyroscopes*," Opt. Lett., Vol. 6, No. 8, 401 (1981), incorporated in its entirety by reference herein):

$$v_{ph,L} = \frac{c}{n(\omega_m)} \pm \alpha v \quad \alpha = \left(1 - \frac{1}{n(\omega_m)^2}\right) \quad (1)$$

$$v_{ph,L} = \frac{c}{n(\omega_L)} \pm \alpha' v \quad \alpha' = \left(1 - \frac{1}{n(\omega_L)^2} + \frac{n_g(\omega_L) - n(\omega_L)}{n(\omega_L)}\right) \quad (2)$$

In Equation (2), $n_g(\omega_L)$ is the group index of the material at the frequency of the light measured in the laboratory frequency. In both Equation (1) and Equation (2), the ± symbol is taken as + if the material and the light are moving in the same direction, and − if they are moving in opposite directions. Equations (1) and (2) are equivalent; the difference between them only comes from the reference frame in which the light frequency is measured. Equation (1) gives the phase velocity in the laboratory frame in terms of the light frequency measured in the material's reference frame. Equation (2) gives the phase velocity in the laboratory frame in terms of the light frequency measured in the laboratory reference frame. Both Equation (1) and Equation (2) express the concept that the phase velocity depends on the velocity of the moving object. In other words, light can be described as being "dragged" by the moving material.

In all free-space, fiber, or waveguide interferometers, the output signal depends on the relative phase of the two signals that are being interfered. By making use of the fact that this phase depends on the velocity of some object through which light is propagating, one can design a number of interferometric velocity (and rotation) sensors. Using the Fresnel-Fizeau drag formula for phase velocity, it is possible to find the time delays (and hence the phase delays) between the two signals being interfered in different interferometer configurations.

FIG. 1 schematically illustrates an interferometric fluid velocity sensor 10 in which a fluid 12 (e.g., a liquid or gas) of index n flows in a closed path (e.g., ring) at constant velocity v. Light 14 from the light source S (e.g., laser) is coupled into the fluid 12 by an optical coupler 16 (e.g., a beamsplitter) and is directed (e.g., by mirrors 18) such that a portion of the light 14 (e.g., a first signal) propagates through the fluid 12 in a direction generally along the fluid flow and a second portion of the light 14 (e.g., a second signal) propagates through the fluid 12 in a direction generally opposite to the fluid flow. In this configuration, the time delay between the two signals reaching the optical detector D (e.g., photodiode) is $\Delta t \approx 2Pv\alpha'n(\omega_L)^2/c^2$, where P is the perimeter of the path followed by the light 14. This configuration was used by Fizeau (H. Fizeau, Comp. Rend., Vol. 33, 349 (1851)) to determine the speed of light in a moving liquid, and the result is well-known (see, e.g., W. R. Leeb, G. Schiffner and E. Scheiterer, "*Optical fiber gyroscopes: Sagnac or Fizeau effect*," Appl. Opt., Vol. 18, No. 9, 1293-1295 (1979), incorporated in its entirety by reference herein; E. J. Post, "*Sagnac Effect*," Rev. Mod. Phys., Vol. 39, 475 (1967)). If the optical index of the moving fluid 12 is known, then this configuration can be used as a sensor of the velocity of fluid flow. Note that the time delay depends on $\alpha'$, which, for large values of the group index $n_g$, is proportional to $n_g/n$, the ratio of the group index to the phase index, as expressed in Equation (2). As a result, the sensitivity of interferometric fluid velocity sensors having the configuration of FIG. 1 is proportional to $\Delta t$, and is proportional to the reciprocal of the velocity of the light traveling through it. Consequently, for interferometric fluid velocity sensors 10 which utilize slow light, the slower the light, the higher its sensitivity to the velocity of the fluid flowing through the closed path.

Figure 2:
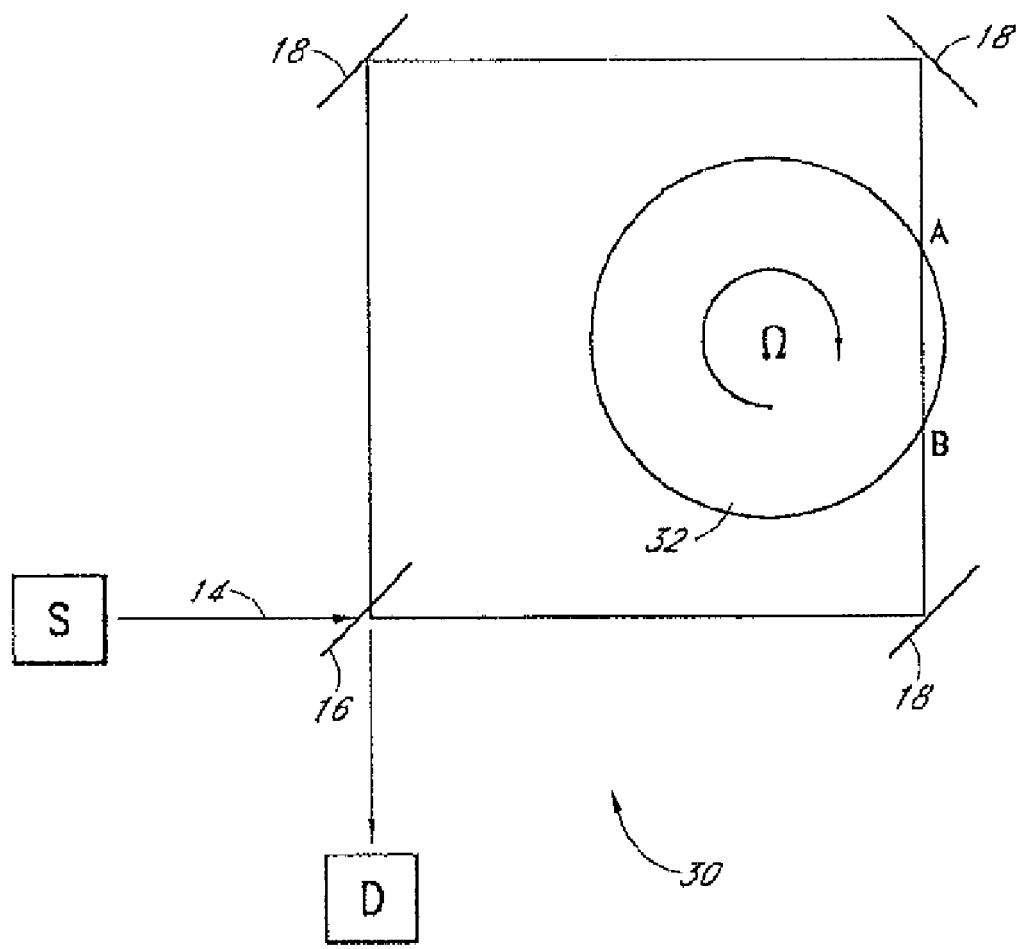
FIG. 2 schematically illustrates an interferometric tangential velocity sensor.

FIG. 2 schematically illustrates an interferometric tangential velocity sensor 30 having a disc 32 of radius R and index n rotating relative to a fixed laboratory frame at some angular frequency $\Omega$ which is inserted into a Sagnac interferometer used in its reciprocal configuration. The same analysis can be made for other kinds of interferometers, including, but not limited to, Mach-Zehnder and Michelson interferometers. Note that the physics of the interferometric tangential velocity sensor 30 schematically illustrated by FIG. 2 is exactly the same as that of the interferometric fluid velocity sensor schematically illustrated by FIG. 1, and this configuration was also predicted by Fizeau.

In this rotation or tangential velocity sensor 30, the distance between points A and B on the disc 32 is L, and the path of the light 14 is assumed to be parallel with the tangential velocity of the disc 32 (although it is not a necessary condition for rotation sensitivity; it just simplifies the algebra a little). The resulting time delay is the same as for the interferometric fluid velocity sensor 10 discussed in relation with FIG. 1, provided that L is substituted for P and $R\Omega$ is substituted for v. As in the case of the interferometric fluid velocity sensor 10, the sensitivity of the tangential velocity sensor 30 is enhanced by the use of slow light. Such as sensor can be made of all free-space components, or can incorporate optical fibers, in particular to replace the portions of light traveling between the source S and point A and between the detector D and point B. A Mach-Zehnder-type Sagnac interferometer having the general configuration of FIG. 2 has been proposed and analyzed (see, M. S. Shahriar, G. S. Pati, R. Tripathi, V. Gopal, M. Messall, and K. Salit, "*Ultrahigh enhancement in absolute and relative rotation sensing using fast and slow light*," Phys. Rev. A, Vol. 75, 053807 (2007).

Figure 3:
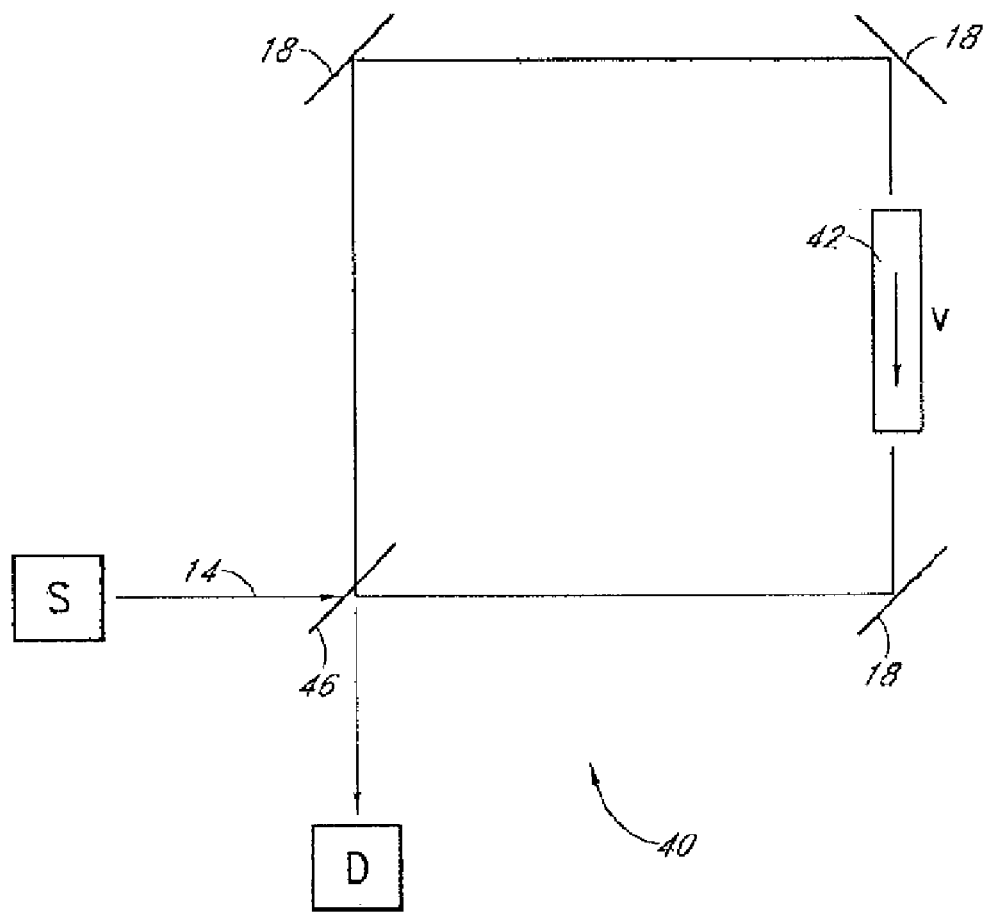
FIG. 3 schematically illustrates an example optical sensor in accordance with certain embodiments described herein.

FIG. 3 schematically illustrates an example optical sensor 40 in accordance with certain embodiments described herein. The optical sensor 40 utilizes slow light to measure the linear velocity of a material (e.g., an optical waveguide 42). The optical sensor 40 comprises at least one optical coupler 46 and an optical waveguide 42 in optical communication with the at least one optical coupler 46. The optical waveguide 42 is configured to receive a first optical signal from the at least one optical coupler 46. The first optical signal has a group velocity and a phase velocity while propagating through at least a portion of the optical waveguide 42. The group velocity is less than the phase velocity. An interference between the first optical signal and a second optical signal is affected by perturbations to at least a portion of the optical sensor 40.

As schematically illustrated by FIG. 3, the at least one optical coupler 46 can comprise a beamsplitter. In addition, the at least one optical coupler 46 can comprise a plurality of mirrors 18. In certain embodiments, the portion of the optical waveguide 42 comprises a Bragg fiber, a photonic-bandgap fiber, or a multilayer film stack inserted into a Sagnac interferometer operated in its reciprocal configuration. In certain embodiments, the group velocity is less than 20% of the speed of light in vacuum, while in certain other embodiments, the group velocity is less than 10% of the speed of light in vacuum. In certain embodiments, the portion of the optical waveguide 42 is solid, while in certain other embodiments, the portion of the optical waveguide 42 comprises a fluid (e.g., a hollow-core optical fiber with a gas or liquid within the core). In certain embodiments, the portion of the optical waveguide 42 is homogeneous, while in certain other embodiments, the portion of the optical waveguide 42 is inhomogeneous. In certain embodiments, the portion of the optical waveguide 42 has a refractive index greater than 1.

In certain embodiments, the perturbations to at least a portion of the optical sensor 40 comprise a movement of the optical waveguide 42 relative to another portion of the optical sensor 40 (e.g., to the at least one optical coupler 46). In certain such embodiments, as schematically illustrated by FIG. 3, the movement comprises a translation of the optical waveguide 42 and the interference is indicative of a velocity of the optical waveguide 42.

In certain embodiments, the optical waveguide 42 is configured to receive the first optical signal and the second optical signal from the at least one optical coupler 46. The optical waveguide 42 of certain embodiments is configured to move along a first direction while the first optical signal propagates through the optical waveguide 42 in the first direction and the second optical signal propagates through the optical waveguide 42 in a second direction generally opposite to the first direction.

The optical sensor 40 of FIG. 3 is different from the two sensors of FIGS. 1 and 2 discussed above, because the end points of the moving optical waveguide 42 in the optical sensor 40 of FIG. 3 are not stationary in the laboratory frame. At least a portion of the optical waveguide 42 has an index n and length L and is moving at velocity v. A Doppler shift component must then be taken into account to calculate the time delay between the two signals counter-propagating through the sensor 40. A careful analysis of this time delay gives $\Delta t \approx 2Ln(\omega_L)v[n(\omega_L)(1-\alpha')-1]/c^2$. In the limit $n_g \gg n$ (slow light), this time delay is proportional to the ratio $n_g/n$, indicating that the sensitivity of this optical sensor 40 is also enhanced by the use of slow light. Unlike the tangential velocity sensor 30 described above with regard to FIG. 2, the physics of the optical sensor 40 schematically illustrated by FIG. 3 is not equivalent to that of the configuration of FIG. 1.

In certain embodiments, the optical sensor 40 schematically illustrated by FIG. 3 senses the linear velocity of the optical waveguide 42. The first optical signal traveling along the first optical path (e.g., clockwise through the interferometer of FIG. 3) propagates through the optical waveguide 42 in a direction generally parallel to the linear velocity of the optical waveguide 42 and the second optical signal traveling along a second optical path (e.g., counterclockwise through the interferometer of FIG. 3) propagates through the optical waveguide 42 in a direction generally opposite to the linear velocity of the optical waveguide 42. The linear movement of the optical waveguide 42 modifies the interference between the first optical signal and the second optical signal detected by the detector D. In certain embodiments, the optical sensor 40 has a sensitivity to the velocity of the optical waveguide 42 which is dependent on the group velocity (e.g., is inversely proportional to the group velocity). In certain embodiments, the optical sensor 40 can be used in any system in which velocity is to be measured, and in certain embodiments, the optical sensor 40 can be formed in a microelectromechanical system (MEMS) configuration.

Figure 4:
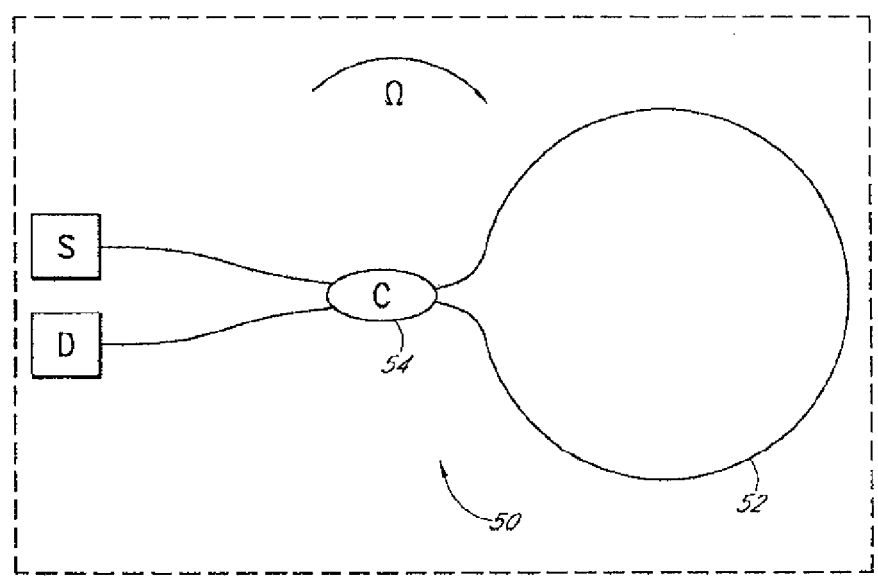
FIG. 4 schematically illustrates a conventional fiber optic gyroscope (FOG).

Knowledge of the optical velocity sensors discussed above can be used to analyze the sensitivity of a conventional fiber-optic gyroscope (FOG) 50. In its simplest form, as schematically illustrated by FIG. 4, the FOG 50 comprises a fiber coil 52 (e.g., having a plurality of loops), a light source S, a detector D, and at least one optical coupler 54. In certain configurations, the at least one optical coupler 54 comprises a first beam splitter or fiber coupler to couple the optical signals from the source S into the coil 52, and a second beam splitter or fiber coupler to tap the optical signals returning from the coil 52 to the detector D. The source S sends two counter-rotating signals into the coil 52, which, after traveling around the coil 52, are recombined at the detector D. In the FOG 50 schematically illustrated by FIG. 4, everything inside the dashed box can rotate at the same rate $\Omega$ about the main symmetry axis of the coil 52, and everything else is stationary with respect to the fixed laboratory frame. When everything inside the dashed box is rotated, the two counter-rotating signals accumulate different phase shifts via the nonreciprocal Sagnac effect, which leads to interference between the two optical signals at the detector D. The interference affects the detected power, which is indicative of (e.g., depends on) $\Omega$.

Despite at least one claim to the contrary (U. Leonhardt and P. Piwnicki, "*Ultrahigh sensitivity of slow-light gyroscope*," Phys. Rev. A, Vol. 62, 055801 (2000)), it has been conclusively proven from first principles (see, e.g., H. J. Arditty and H. C. Lefevre, "*Sagnac effect in fiber gyroscopes*," Opt. Lett., Vol. 6, No. 8, 401 (1981), incorporated in its entirety by reference herein) that the sensitivity of this conventional FOG 50 is independent of both the phase index n and the group index $n_g$ of the mode of the fiber from which the FOG 50 is constructed. The physical reason for this independence, which can be demonstrated from the equations cited above, is that as the phase index of the light propagating in the coil 52 changes (e.g., increases), two opposing effects take place. One effect is that the phase increases proportionally to the phase index. As a result of this effect, increases of the phase index results in increases of the differential phase change due to rotation between the two counter-propagating waves. The other effect is that the light traveling in the direction of the rotation gets dragged by the Fresnel-Fizeau drag effect and travels a little faster, while light traveling against the direction of the rotation is dragged with the opposite sign, so it travels a little slower. As a result of this effect, the differential phase change due to rotation between the two counter-propagating waves decreases. H. J. Arditty and H. C. Lefevre, cited above, have shown mathematically that these two effects of opposite sign have exactly the same magnitude, so they exactly cancel one another. Thus, for the conventional FOG 50 schematically illustrated by FIG. 4, the rotation sensitivity is independent of the phase index. It is hence also independent of its derivatives (e.g., group index) and the group velocity. However, as described more fully below, in a configuration in which the group index or group velocity is explicitly in the equations, an optical sensor can exhibit a sensitivity which is dependent on the group index or group velocity.

The FOG 50 of FIG. 4 is sensitive to absolute rotation of the FOG 50, and it is used in commercial applications for inertial navigation (e.g., in aircraft). As described with regard to the examples below, in certain embodiments, gyroscope configurations slightly different from the one in FIG. 4 are considered. In these other configurations, different parts of the FOG can rotate relative to one another, unlike in a conventional FOG 50, in which typically the whole device rotates. In these other configurations, the FOG has a sensitivity to relative rotation (e.g., rotation of one part of the device relative to another) Certain such embodiments are advantageously used for applications in which only extremely small rotations are applied to a portion of the FOG (unlike inertial navigation of an airplane or automobile, in which the FOG is routinely called to make full turns about at least one rotation axis).

The sensitivity of a conventional FOG 50 is not changed by slow light, whereas the sensitivity of the optical velocity sensor 40 discussed above can be made proportional to the group velocity $v_g$ or the group index $n_g$. In certain embodiments, a two-wave interferometer has a sensitivity which is affected by slow light when the frequencies of the two waves are different when measured in the material's frame of reference. In other words, the optical sensor of certain embodiments described herein has one or more optical pathlengths which change in response to the perturbations applied to the optical sensor. By having relative motion between two portions of the optical sensor which change the one or more optical pathlengths, certain embodiments described herein exhibit a Doppler shift of frequencies between two optical signals. This distinction between configurations which have a slow-light-enhanced sensitivity and configurations which do not is illustrated by the following configurations. Many more embodiments are also possible to be designed from this same basic principle for sensitivity which is enhanced by slow light.

Figure 5:
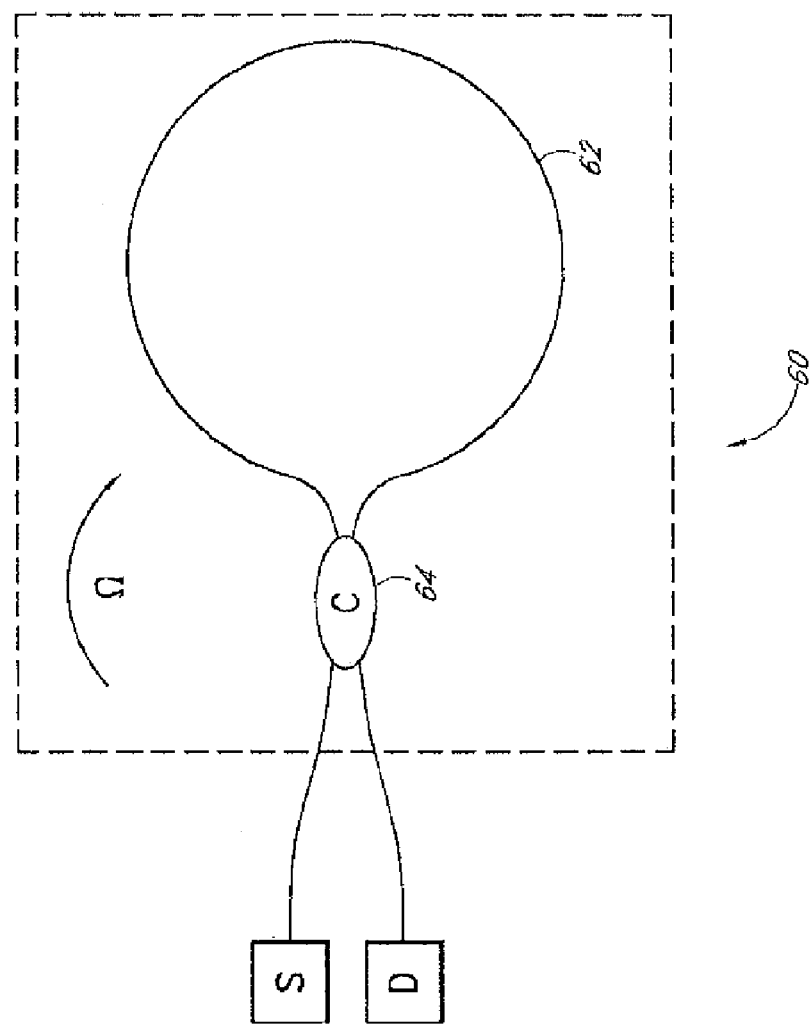
FIG. 5 schematically illustrates a fiber optic gyroscope with stationary source and detector.

FIG. 5 schematically illustrates an FOG 60 having a coil 62 and at least one optical coupler 64. For the FOG 60 of FIG. 5, the source S and the detector D are fixed in an inertial reference frame, and the rest of the FOG 60 rotates at a rate Ω. As the rotation occurs, the pathlengths between the at least one optical coupler 64 and the source S and the detector D do not change (e.g., the optical waveguides are merely deflected). The FOG 60 behaves exactly like the conventional FOG 50 shown in FIG. 4. There is no Doppler shift in the configuration of FIG. 5, and the at least one optical coupler 64 serves as the effective light source for the FOG 60. This FOG 60 does not have a sensitivity which benefits from slow light.

Figure 6:
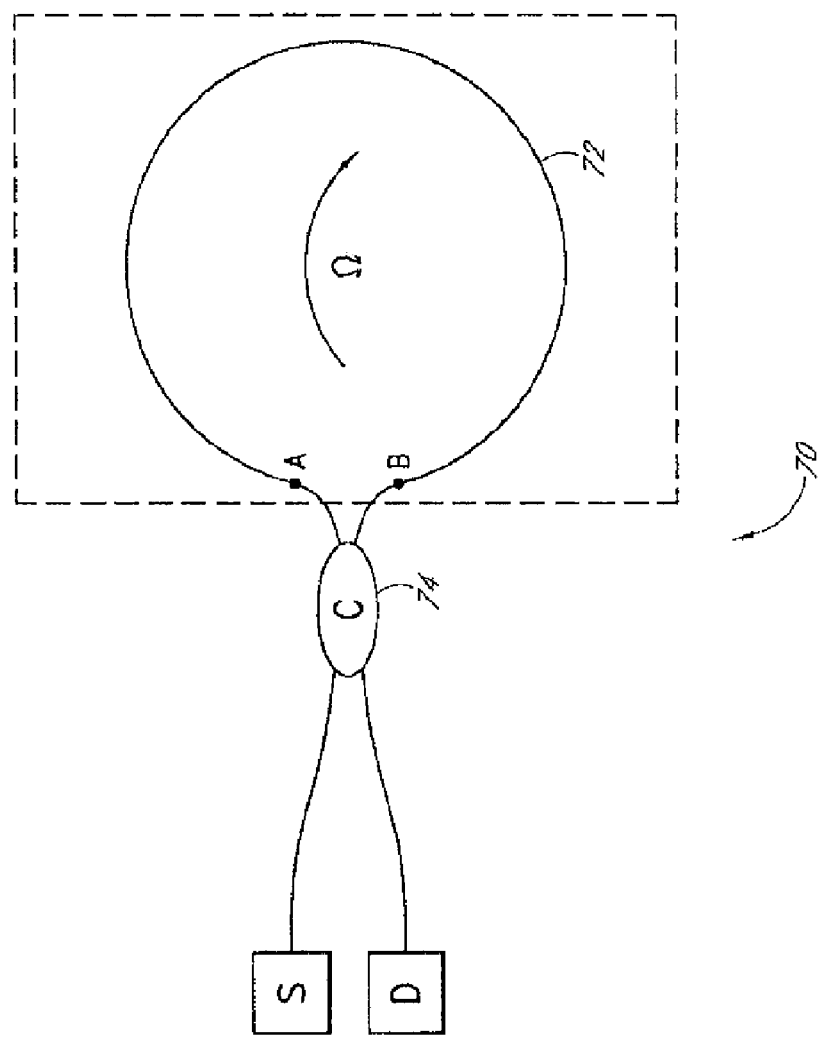
FIG. 6 schematically illustrates a fiber optic gyroscope with a stationary source, detector, and coupler.

FIG. 6 schematically illustrates an FOG 70 having a coil 72 and at least one optical coupler 74. For the FOG 70 of FIG. 6, the at least one optical coupler 74 is moved outside the dotted box, indicating that the at least one optical coupler 74 is stationary as well as the source S and the detector D. As the rotation occurs, the pathlengths between the at least one optical coupler 74 and the coil 72 do not change (e.g., the optical waveguides are merely deflected). The FOG 70 also behaves in the same way as the two FOGs 50, 60 of FIGS. 4 and 5. The light coming out of the at least one optical coupler 74 has the same frequency measured at either point A or point B, which means that this FOG 70 behaves just as if the at least one optical coupler 74 were co-rotating with the loop 72. The sensitivity of the FOG 70 is independent of the group velocity and the group index, and it does not benefit from the use of slow light.

Figure 7A:
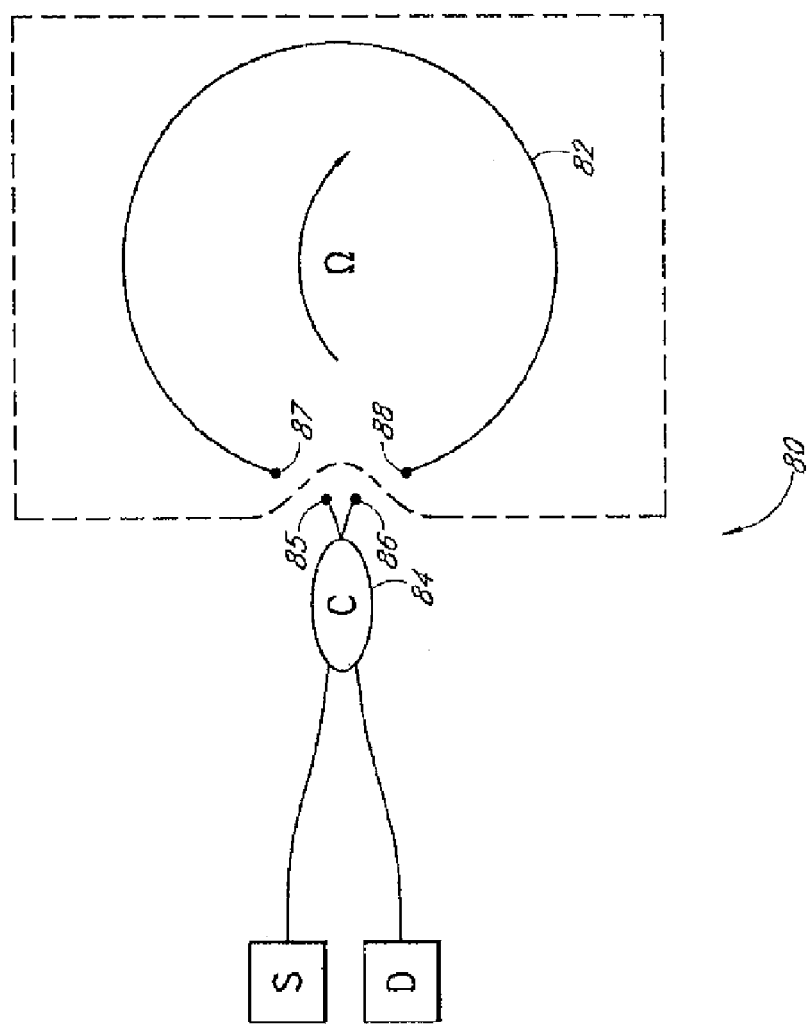
FIG. 7A schematically illustrates an example fiber optic gyroscope in accordance with certain embodiments described herein.

FIG. 7A schematically illustrates an example FOG 80 in accordance with certain embodiments described herein. The FOG 80 comprises an optical waveguide 82 (e.g., a fiber coil comprising a plurality of loops) and at least one optical coupler 84 (e.g., a 3-dB fiber coupler). The optical waveguide 82 is in optical communication with the at least one optical coupler 84. The optical waveguide 82 is configured to receive a first optical signal from the at least one optical coupler 84. The first optical signal has a group velocity and a phase velocity while propagating through at least a portion of the optical waveguide 82, with the group velocity less than the phase velocity. Interference between the first optical signal and a second optical signal is affected by perturbations to at least a portion of the FOG 80.

In certain embodiments, the optical waveguide 82 is in a coiled configuration with a plurality of loops (e.g., 100 or more loops) which are generally parallel with one another. At least a portion of the optical waveguide 82 supports slow light propagation (e.g., at least a portion of the optical waveguide 82 comprises a Bragg fiber or a photonic-bandgap fiber), and in certain embodiments, the optical waveguide 82 supports slow light propagation along its entire length.

As schematically illustrated by FIG. 7A, in certain embodiments, the FOG 80 further comprises a light source S and a light detector D. The source S, detector D, and the at least one optical coupler 84 of certain embodiments are stationary, and the optical waveguide 82 is configured to move relative to the stationary source S, detector D, and at least one optical coupler 84. In certain such embodiments, the perturbations comprise a rotation of the optical waveguide 82 relative to another portion of the FOG 80 (e.g., the source S, the detector D, and the at least one optical coupler 84). In certain embodiments, the rotation is about an axis of symmetry of the coiled optical waveguide 82.

In certain embodiments, the at least one optical coupler 84 is mechanically decoupled from the optical waveguide 82 such that the at least one optical coupler 84 and the optical waveguide 82 can be moved relative to one another. For example, in certain embodiments, the optical waveguide 82 is configured to move along a first direction (e.g., rotated clockwise about a symmetry axis of the coiled optical waveguide 82), as schematically illustrated by FIG. 7. During this rotation of the optical waveguide 82, the first optical signal from the at least one optical coupler 84 propagates through the optical waveguide 82 in the first direction (e.g., clockwise through the coiled optical waveguide 82) and the second optical signal from the at least one optical coupler 84 propagates through the optical waveguide 82 in a second direction generally opposite to the first direction (e.g., counterclockwise through the coiled optical waveguide 82).

In certain embodiments, as schematically illustrated by FIG. 7A, the at least one optical coupler 84 comprises a first port 85 and a second port 86, and the coiled optical waveguide 82 comprises a first end 87 and a second end 88. The first port 85 is optically coupled to the first end 87 and the second port 86 is optically coupled to the second end 88. In certain such embodiments, the FOG 80 comprises a first gap between the first port 85 and the first end 87 such that optical signals traveling between the first port 85 and the first end 87 propagate in free space. The FOG 80 of certain such embodiments comprises a second gap between the second port 86 and the second end 88 such that optical signals traveling between the second port 86 and the second end 88 propagate in free space. In certain other embodiments, the FOG 80 comprises a first lengthwise stretchable optical waveguide (e.g., a waveguide comprising a polymer material) between the first port 85 and the first end 87, and a second lengthwise stretchable optical waveguide between the second port 86 and the second end 88.

The changing optical pathlengths of the region between the first port 85 and the first end 87 and the region between the second port 86 and the second end 88 affect the sensitivity of the FOG 80 significantly. In certain such embodiments, the system is analogous to the interferometric velocity sensor 40 schematically illustrated in FIG. 3. If L denotes the length of the coiled optical waveguide 82 and v=RΩ denotes the velocity of the optical waveguide 82, then the time delay between the counter-propagating signals for the FOG 80 is also the same as for the interferometric velocity sensor 40, e.g., $\Delta t \approx 2Ln(\omega_L)v[n(\omega_L)(1-\alpha')-1]/c^2$. Therefore, the FOG 80 is an optical sensor which has a sensitivity advantageously enhanced by slow light. In certain embodiments, the FOG 80 has a sensitivity to rotation of the coiled optical waveguide 82 which is dependent on the group velocity or the group index.

In certain embodiments, the FOG 80 can be used as a practical rotation sensor in applications where the applied rotation has a finite excursion, for example to detect flexing of large structures such as sea platforms or buildings, or to detect movement of mechanical parts, such as mirrors in a bulk-optic interferometer. As the coiled optical waveguide 82 rotates, a first optical pathlength between the first port 85 of the at least one optical coupler 84 and the first end 87 of the coiled optical waveguide 82 changes and a second optical pathlength between the second port 86 of the at least one optical coupler 84 and the second end 88 of the coiled optical waveguide 82 changes. The FOG 80 is responsive to changes of the first optical pathlength, the second optical pathlength, or both the first and second optical pathlengths.

Figure 7B:
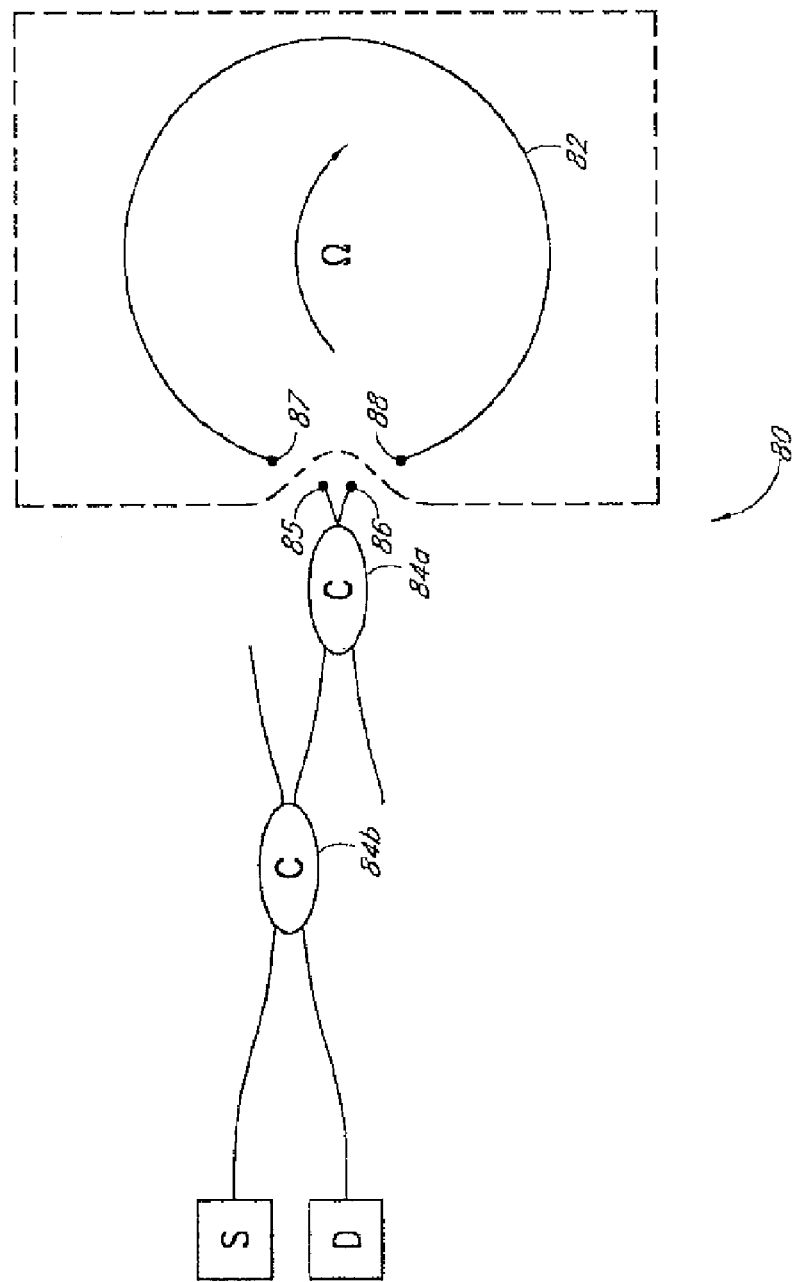
FIG. 7B schematically illustrates a reciprocal configuration of the fiber optic gyroscope of FIG. 7A in accordance with certain embodiments described herein.
Figure 7C:
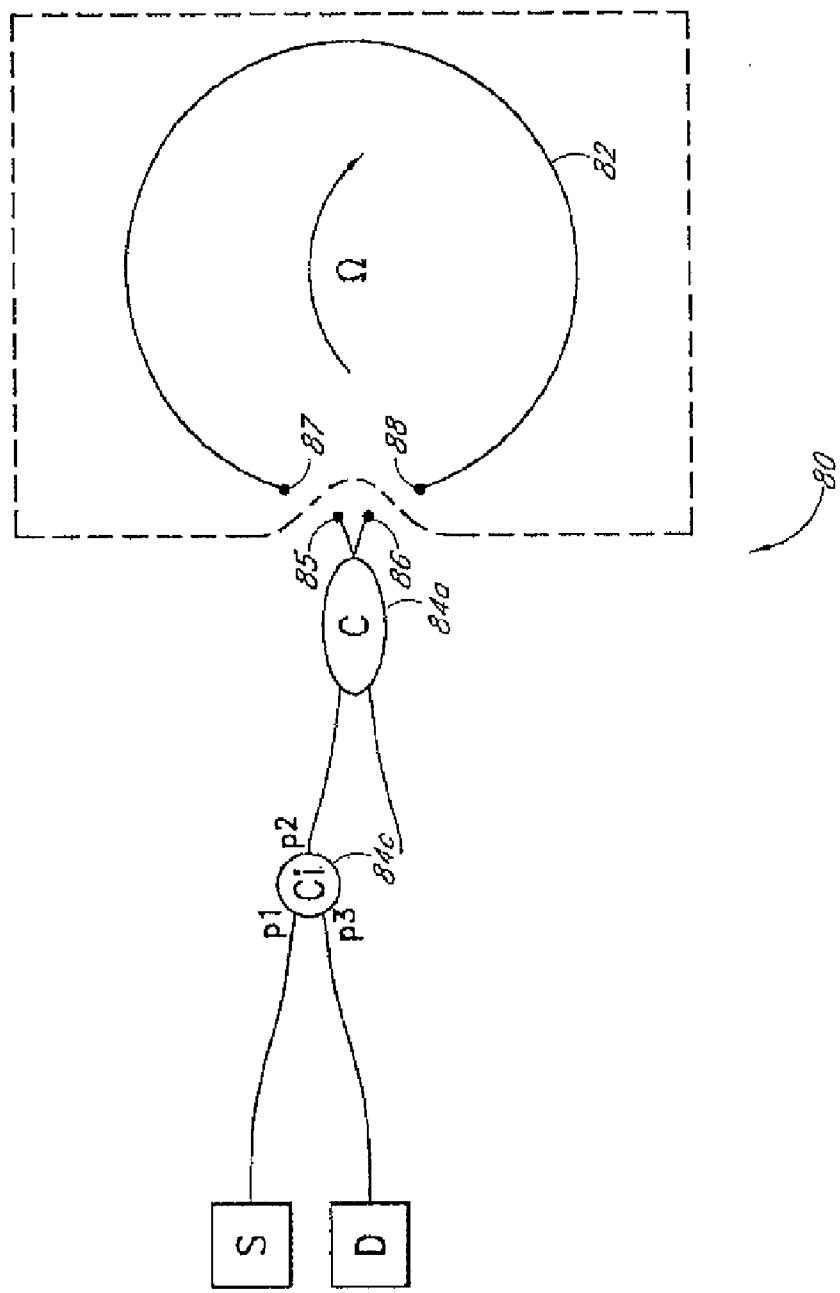
FIG. 7C schematically illustrates another reciprocal configuration of the fiber optic gyroscope of FIG. 7A utilizing a circulator in accordance with certain embodiments described herein.

FIG. 7B schematically illustrates a reciprocal configuration of the FOG 80 of FIG. 7A utilizing at least one optical coupler comprising a first fiber coupler 84a and a second fiber coupler 84b. FIG. 7C schematically illustrates another reciprocal configuration of the FOG 80 of FIG. 7A utilizing at least one optical coupler 84 comprising a first fiber coupler 84a and a three-port circulator 84c having ports p1, p2, and p3. Other configurations of optical couplers are also compatible with various embodiments described herein.

Figure 8A:
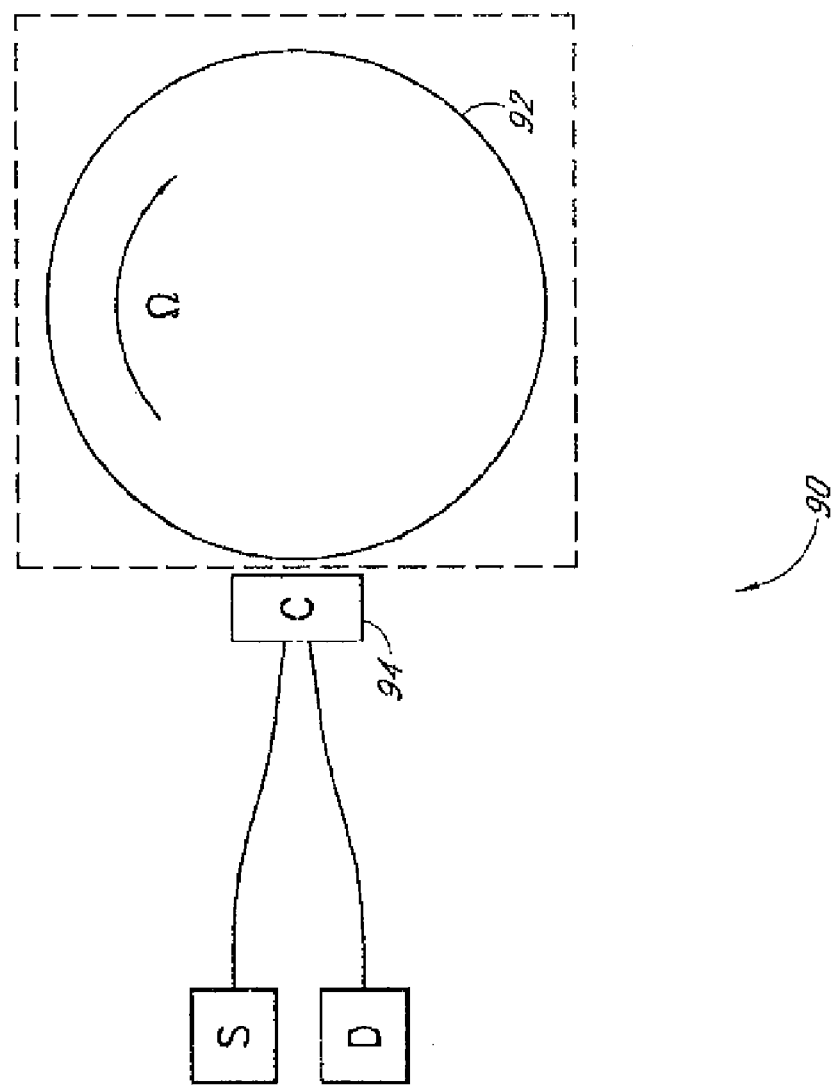
FIG. 8A schematically illustrates another example fiber optic gyroscope in accordance with certain embodiments described herein with a prism coupler and a rotating fiber coil.

FIG. 8A schematically illustrates another example FOG 90 in accordance with certain embodiments described herein. The FOG 90 of FIG. 8A comprises a coiled optical waveguide 92 (e.g., at least a portion of which comprising a Bragg fiber or a photonic-bandgap fiber) and at least one optical coupler 94 which is evanescently coupled to the optical waveguide 92 (e.g., a prism coupler), with the coiled optical waveguide 92 rotating relative to the at least one optical coupler 94. The FOG 90 is analogous to the optical sensor 10 depicted in FIG. 1, with the flowing fluid 12 replaced by the rotating optical waveguide 92, and the fixed beam splitter 16 replaced with the at least one optical coupler 94 (e.g., prism coupler). As described above, the interferometric fluid velocity sensor 10 has a sensitivity which depends on the group index of the fluid, and the use of slow light provides enhancements of the sensitivity. The FOG 90 of FIG. 8A has a sensitivity which depends on the group index or group velocity of light in the optical waveguide 92, and the use of slow light provides enhancements of the sensitivity.

Figure 8B:
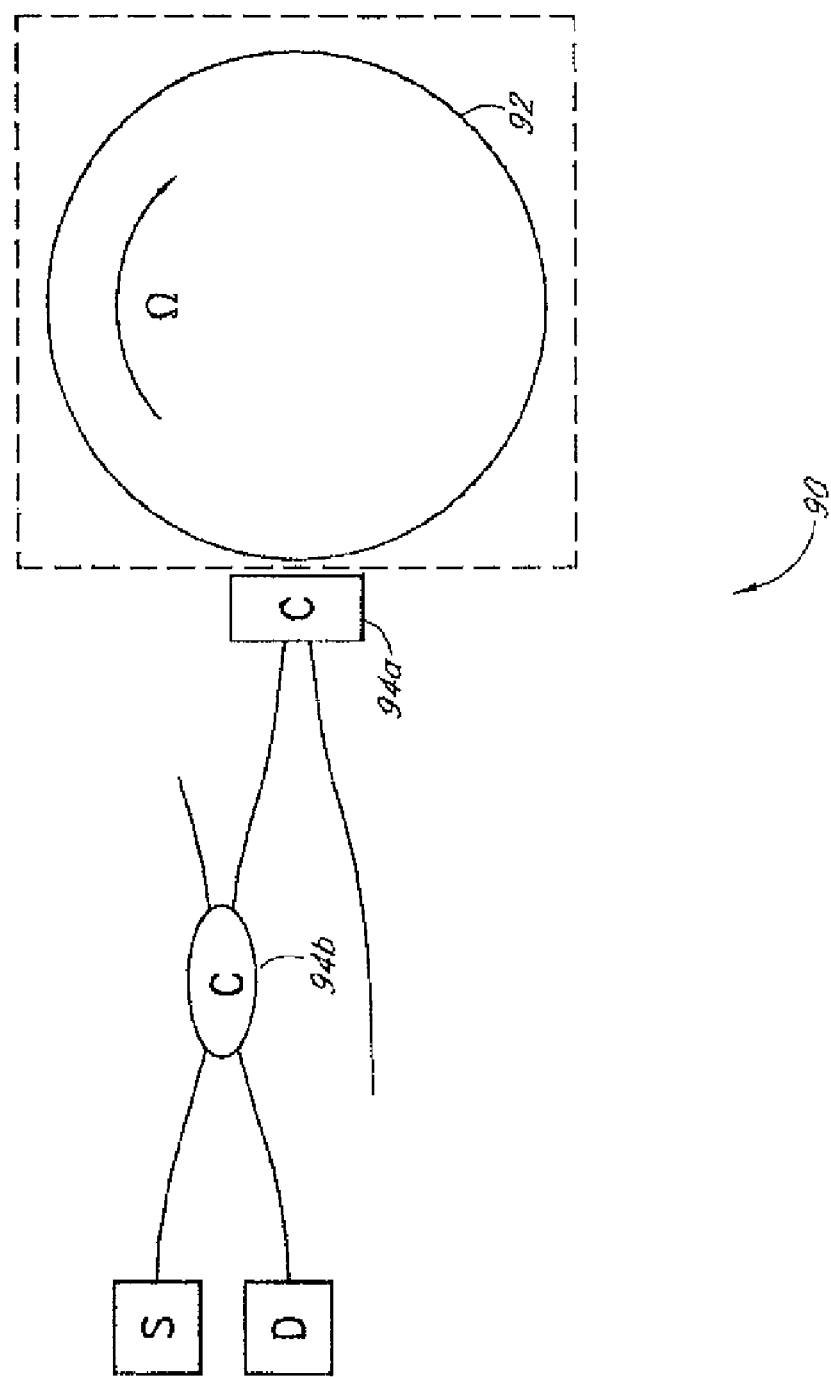
FIG. 8B schematically illustrates the example fiber optic gyroscope of FIG. 8A in a reciprocal configuration in accordance with certain embodiments described herein.
Figure 8C:
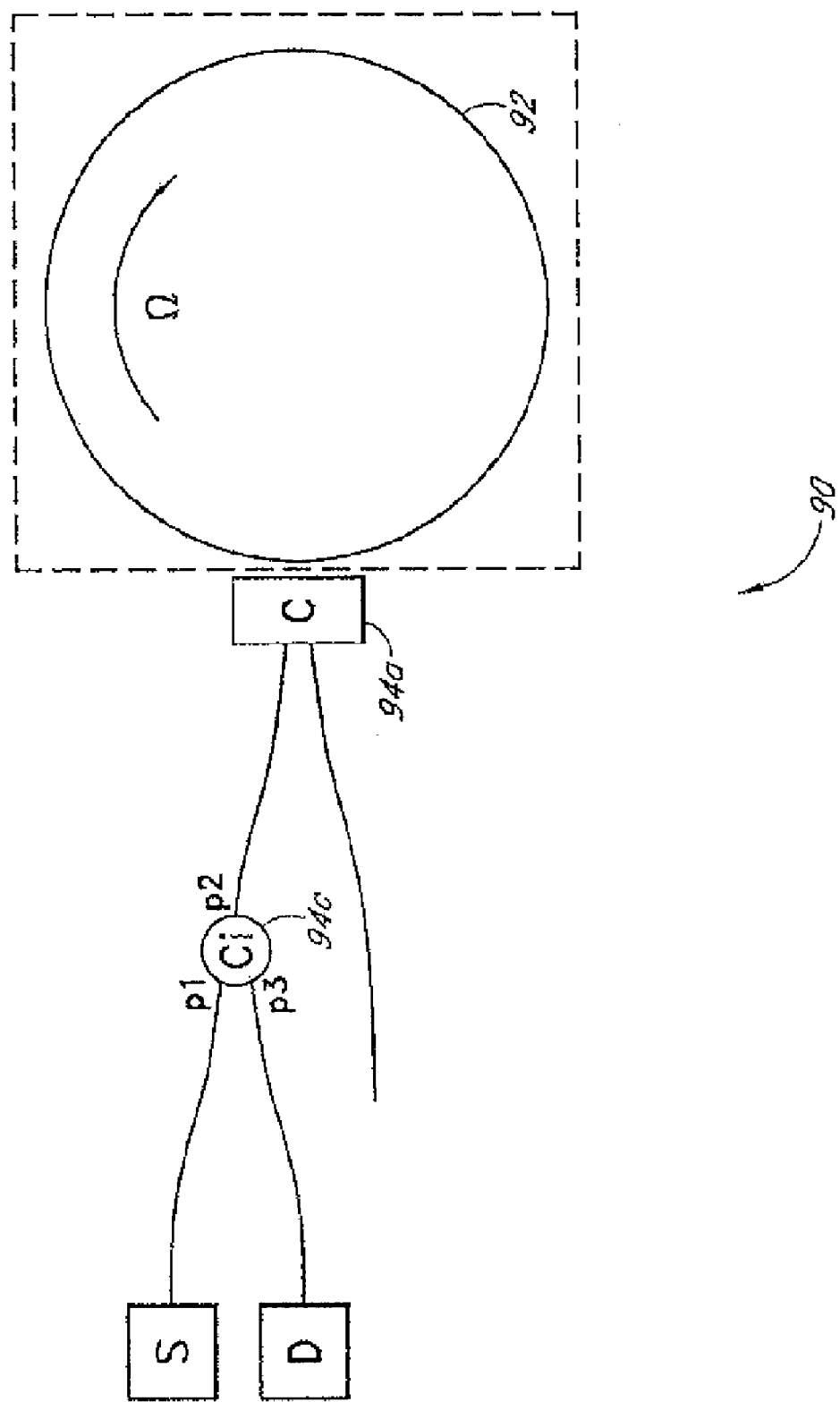
FIG. 8C schematically illustrates another reciprocal configuration of the fiber optic gyroscope of FIG. 8A utilizing a circulator in accordance with certain embodiments described herein.

FIG. 8B schematically illustrates the FOG 90 in a reciprocal configuration in which the at least one optical coupler 94 comprises a first coupler 94a and a second coupler 94b. In certain such embodiments, the light returning from the Sagnac loop is collected at the reciprocal output port, which is the port into which light is launched into the loop. (See, e.g., H. Lefèvre, *The Fiber-Optic Gyroscope*, Artech House, Boston, Ch. 3, 1993, incorporated in its entirety by reference herein.) This can be accomplished in a straightforward manner by placing a coupler (e.g., a fiber coupler) on the light input port, and collecting the return light at the fourth port of the coupler, as schematically illustrated in FIG. 8B. In certain other embodiments, a similar change can be made to the optical sensors described herein for reciprocal operation, which leads to better stability of the optical sensor. FIG. 8C schematically illustrates another reciprocal configuration of the FOG 90 of FIG. 8A utilizing at least one optical coupler 94 comprising a first fiber coupler 94a and a three-port circulator 94c having ports p1, p2, and p3. Other configurations of optical couplers are also compatible with various embodiments described herein.

The FOG 90 of FIGS. 8A-8C can have the same kind of applications as does the FOG 80 of FIGS. 7A-7C. In certain embodiments, the at least one optical coupler 94 rotates about an axis generally perpendicular to the optical waveguide 92 such that the at least one optical coupler 94 and the optical waveguide 92 move relative to one another. The FOG 90 is responsive to relative rotations between the at least one optical coupler 94 and the optical waveguide 92.

Other types of sensors that can be enhanced by the use of slow light are fiber strain sensors and temperature sensors. As described below, the phase sensitivity of an idealized fiber (modeled as a simple homogeneous cylindrical rod) to changes in longitudinal strain and temperature are considered simultaneously. In these calculations, the fiber cross-section is uniform along its length, and the slow light is due to the transverse structure of the fiber (e.g., as in a Bragg fiber; see, e.g., C. Lin, W. Zhang, Y. Huang, and J. Peng, "Zero dispersion slow light with low leakage loss in defect Bragg fiber," Appl. Phys. Lett., Vol. 90, 031109 (2007), incorporated in its entirety by reference herein). Both temperature and strain affect the fiber in three ways: changing its longitudinal dimension, changing its transverse dimension, and changing its index of refraction. These changes are discussed more fully below.

If the length of an optical waveguide (e.g., fiber) is changed (e.g., by applying a temperature change or a strain) from $L_0$ to $L_0+\Delta L$, then the change in the phase of a signal of wavelength $\lambda$ propagating through the waveguide can be expressed by $\Delta \Phi_L = 2\pi n_{eff} \Delta L/\lambda$. If the length change is induced by a temperature change $\Delta T$, $\Delta L$ can be expressed by the thermal expansion of the waveguide as $\Delta L = \alpha L_0 \Delta T$, where $\alpha$ is the thermal expansion coefficient of the waveguide. If the change of length is induced by a longitudinal strain $\epsilon$, then the change in length can be expressed by $\Delta L = \epsilon L_0$. Neither of these effects depends on the group index or the group velocity, so while an optical sensor can be responsive to changes of the length of the waveguide, the sensitivity of the optical sensor to such changes is not enhanced by the use of slow light.

Suppose a waveguide mode has an effective index $n(\lambda)$. When the transverse dimension of the waveguide is scaled uniformly (e.g., as occurs due to either a strain or a change in temperature) by a factor $(1+\delta)$, the effective index of the mode is scaled as well: it becomes $n_{eff}(\lambda(1+\delta))$. That is, the mode of the scaled waveguide has the same effective index at wavelength $(1+\delta)\lambda$ as the original waveguide had at wavelength $\lambda$. This means that even if the signal frequency is constant, the effective (normalized) frequency of the signal is changed due to the change in the waveguide's transverse dimension. This causes the group index to appear in the effective index: $\Delta n_{eff} = (n_g - n_{eff})\delta$ and hence $$\Delta \Phi_T = 2\pi \frac{L}{\lambda}(n_g - n_{eff})\delta.$$

If the transverse dimension is changed by a temperature change, then $\delta = \alpha \Delta T$. If the transverse dimension change is induced by a longitudinal strain $\epsilon$, then $\delta = -\epsilon \nu$, where $\nu$ is Poisson's ratio of the waveguide. Therefore, in certain embodiments, the sensitivity of a waveguide to either a strain and a temperature change depends on the group index or the group velocity of light propagating through the waveguide, and a more sensitive temperature or strain fiber sensor can advantageously be achieved by using slow light.

Figure 9:
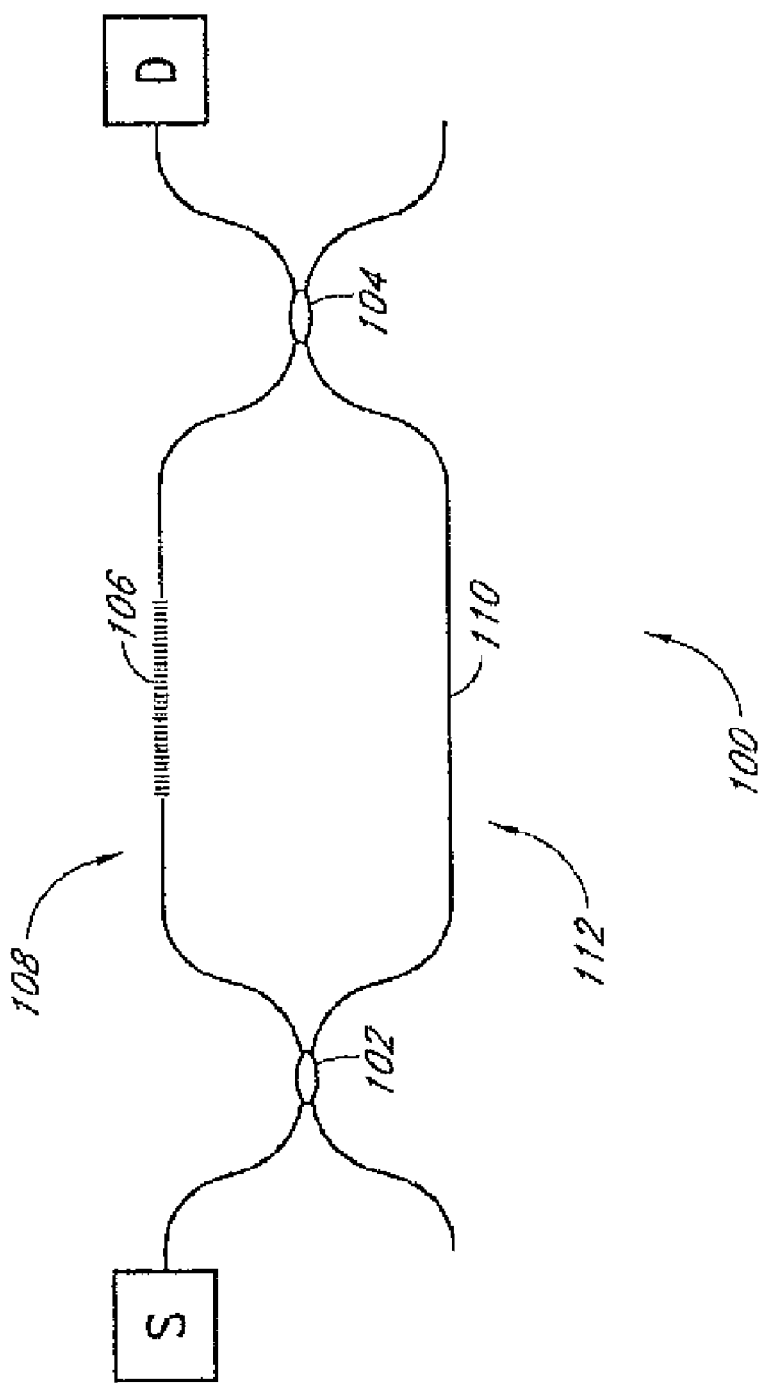
FIG. 9 schematically illustrates an example optical sensor having a Mach-Zehnder configuration in accordance with certain embodiments described herein.

FIG. 9 schematically illustrates an example optical sensor 100 having a Mach-Zehnder configuration in accordance with certain embodiments described herein. The optical sensor 100 comprises at least one optical coupler (e.g., a first optical coupler 102 and a second optical coupler 104) and an optical waveguide 106 (e.g., in a sensing arm 108 of the optical sensor 100) in optical communication with the at least one optical coupler. The optical waveguide 106 is configured to receive a first optical signal (e.g., a first portion of an optical signal received by the first optical coupler 102 from the source S) from the at least one optical coupler. The first optical signal has a group velocity and a phase velocity while propagating through at least a portion of the optical waveguide 106, with the group velocity less than the phase velocity. An interference between the first optical signal and a second optical signal is affected by perturbations (e.g., change of longitudinal strain, changes of temperature) applied to the optical waveguide 106.

In certain embodiments, as schematically illustrated by FIG. 9, the second optical signal comprises a second portion of the optical signal received by the first optical coupler 102 from the source S. The second optical signal propagates through a conventional optical waveguide 110 (e.g., having a group velocity equal to the phase velocity) in a reference arm 112 of the optical sensor 100. The first optical signal and the second optical signal are received by the second optical coupler 104 and interference between the first and second optical signals is detected by the detector D. In certain embodiments, the sensitivity of the optical sensor 100 to the perturbations is inversely proportional to the group velocity.

The application of either a strain (via the elasto-optic effect) or a temperature change (via the thermo-optic effect) can change the waveguide's index of refraction. For a change in material index $\Delta n$, the change in the effective mode index $n_{eff}$ is $\Delta n_{eff} = (n_g/n_{eff})\sigma\Delta n$ (see, e.g., M. Soljacic, S. G. Johnson, S. Fan, M. Ibansecu, E. Ippen and J. D. Joannopoulos, "*Photonic-crystal slow-light enhancement of nonlinear phase sensitivity,*" J. Opt. Soc. Am. B, Vol. 19, No. 9, 2052-2059 (2002), incorporated in its entirety by reference herein) where a denotes the fraction of the mode power carried in the material whose index is being altered. This leads to a phase change $\Delta\Phi_T = 2\pi(L/\lambda)(n_g/n_{eff})\sigma\Delta n$ For the thermo-optic effect, $\Delta n = \gamma \Delta T$, where $\gamma$ is the thermo-optic coefficient.

The complete picture in a real optical fiber is significantly more complicated than this simple analysis, however. An optical fiber is in general composed of several materials, each with different mechanical and thermal properties. For example, in a conventional single-mode fiber, the core, the cladding, and the jacket all have different mechanical and thermal properties. Similarly, in a photonic-bandgap fiber, the core, the lattice, the silica cladding, and the acrylate jacket have different properties. The same is true of a Bragg fiber, which is made of materials with dissimilar properties. Thus, when the temperature of a real fiber is changed, the different materials expand differently, which leads to non-uniform thermally-induced strains in the fiber. In certain such embodiments, these strains perturb the refractive indices of the various materials via the elasto-optic effect, which in turn changes the fiber effective index. For example, an extensive analysis of these effect in air-core photonic-bandgap fibers (PBFs) is provided by V. Dangui, H. K. Kim, M. J. F. Digonnet, and G. S. Kino, "*Phase sensitivity to temperature of the fundamental mode in air-guiding photonic-bandgap fibers,*" Opt. Express, Vol. 13, No. 18, 6669-6684 (2005), incorporated in its entirety by reference herein. While actual fibers are more complex than the simplified first-order model described herein and some differences are expected, the results of these calculations are instructive for predicting the general properties of actual optical sensor systems.

For example, for an optical waveguide comprising a Bragg fiber with an air-core (e.g., as discussed by V. Dangui, H. K. Kim, M. J. F. Digonnet, and G. S. Kino, "*Phase sensitivity to temperature of the fundamental mode in air-guiding photonic-bandgap fibers,*" Opt. Express, Vol. 13, No. 18, 6669-6684 (2005)), the longitudinal component of the strain is slightly greater than that of a conventional fiber (having the same cladding thickness and material). The transverse component of the strain is a more complex function of temperature due to the more complex and heterogeneous nature of the fiber cross-section. As mentioned above, this transverse component of the strain was not included in the modeling described herein due to its complexity. However, it was calculated for an air-core photonic-bandgap fiber (PBF) by Dangui et al., cited above, and it is slightly weaker. A similar trend is expected towards a slight reduction in the case of an air-core Bragg fiber. In addition, in an air-core Bragg fiber, the thermo-optic term is much lower because the thermo-optic coefficient of air is much lower than that of a solid. This result is independent of the group velocity of the light. This term is so much weaker in air that a large percentage of the total phase change with temperature in an air-core PBF has been shown theoretically and experimentally to be significantly lower than that of a conventional fiber (see, Dangui et al. cited above). For example, in the particular PBF studied by Dangui et al. (obtained from Crystal Fibre of Denmark), the reduction in the temperature dependence of the phase on temperature is by about a factor of seven. As a result of its similarity to this air-core PBF, a similar trend is expected for an air-core Bragg fiber. Therefore, another benefit of using an air-core Bragg fiber to generate slow light and enhanced sensitivity in an optical sensor is that its temperature sensitivity is reduced (e.g., by a factor of three or more) since the mode is mostly guided in air.

As discussed above, in certain embodiments, the application of a strain causes a change in the fiber index, which changes the effective mode index in the fiber. As in the case of thermally-induced strains, calculations of the strain profile in a real fiber constructed from several materials having different mechanical properties is complicated. To somewhat simplify the analysis, the effect of strain in a conventional single-mode solid-core fiber can be considered (see, e.g., G. B. Hocker, "*Fiber-optic sensing of pressure and temperature,*" Appl. Opt., Vol. 18, No. 19, 1445 (1979), incorporated in its entirety by reference herein). While there are no known ways at present to induce slow light in a conventional fiber, this analysis is still informative to derive general trends.

The strain-induced index change in a conventional single-mode fiber is $\Delta n = -n^3[\epsilon(1-\mu)p_{12}-\mu\epsilon p_{11}]/2$, where $p_{11}$ and $p_{12}$ are components of the strain-optic tensor. For silica, $p_{11}=0.121$ and $p_{12}=0.27$. Using the formula $\Delta n_{eff}=(n_g/n_{eff})\sigma\Delta n$ from above, the change in the effective index in a solid-core fiber can be calculated for various values of $n_{eff}$ and $n_g$.

To provide a numerical example of how the strain and thermal phase sensitivities of a fiber depend on its group index, the case of a solid-core fiber with mean refractive index $n=1.45$ is considered. The analysis of the thermal expansion is simplified by assuming that the mechanical properties of all parts of the fiber are the same (e.g., no jacket) and the strain-induced index change is given by the above equation. It is also assumed that the group index can be freely changed ($n_g$ is treated as a free variable) without changing the thermal or mechanical properties of the fiber. For simplicity, it is assumed that $\sigma=1$, corresponding to all of the power being carried within the solid material of the fiber.

Figure 10:
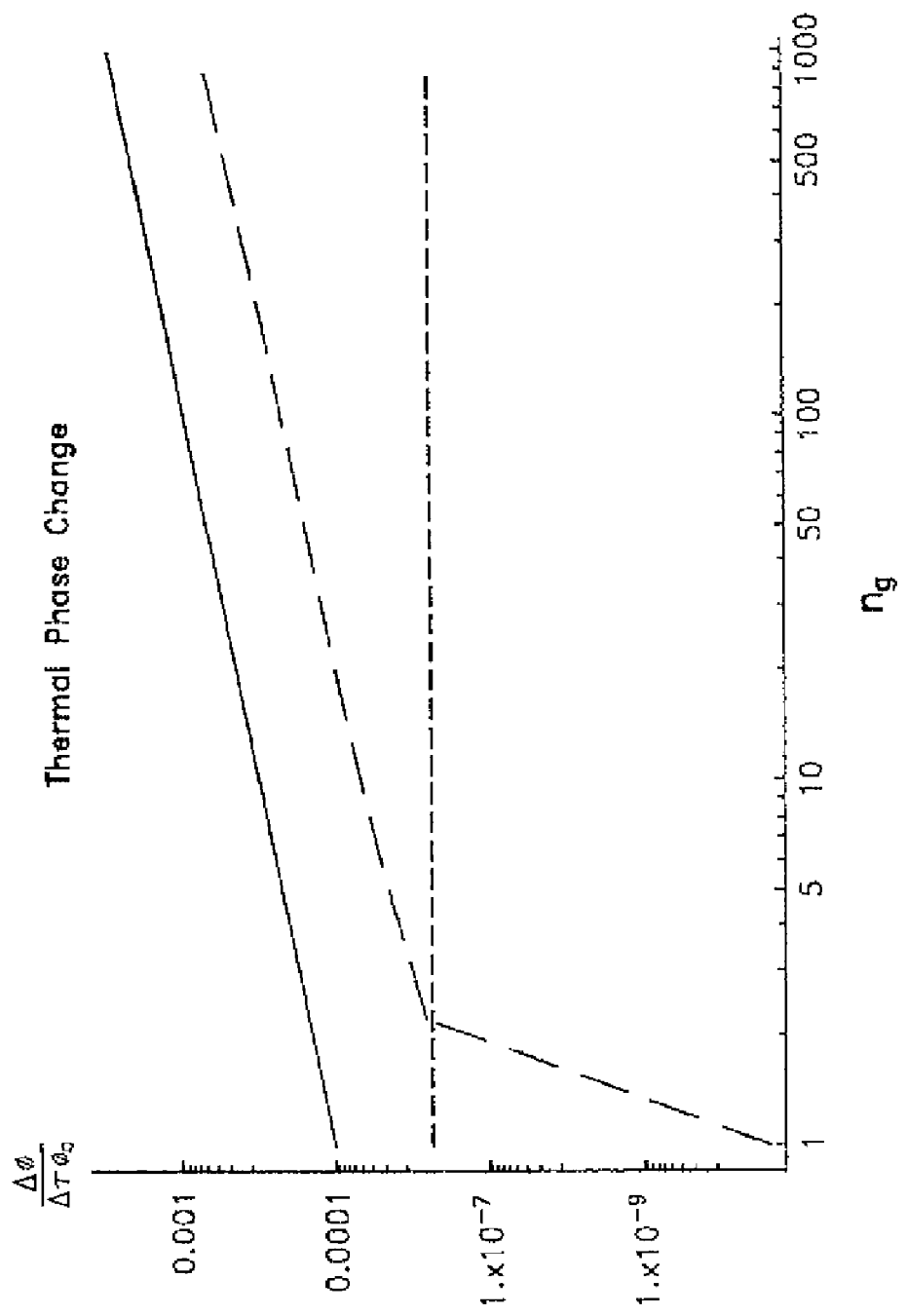
FIG. 10 is a plot of the calculated normalized phase changes due to changing the temperature of a solid-core fiber with a mean refractive index of 1.45.

FIG. 10 plots the normalized phase changes that result from changing the temperature of this fiber. The solid line is the phase change caused by the thermo-optic effect, the dashed line is the phase change due to transverse expansion of the fiber, and the dotted line is the phase change from the longitudinal expansion of the fiber. In accordance with the above derivations, both the thermo-optic and transverse expansion phase delays exhibit enhancement when $n_g$ is large.

Figure 11:
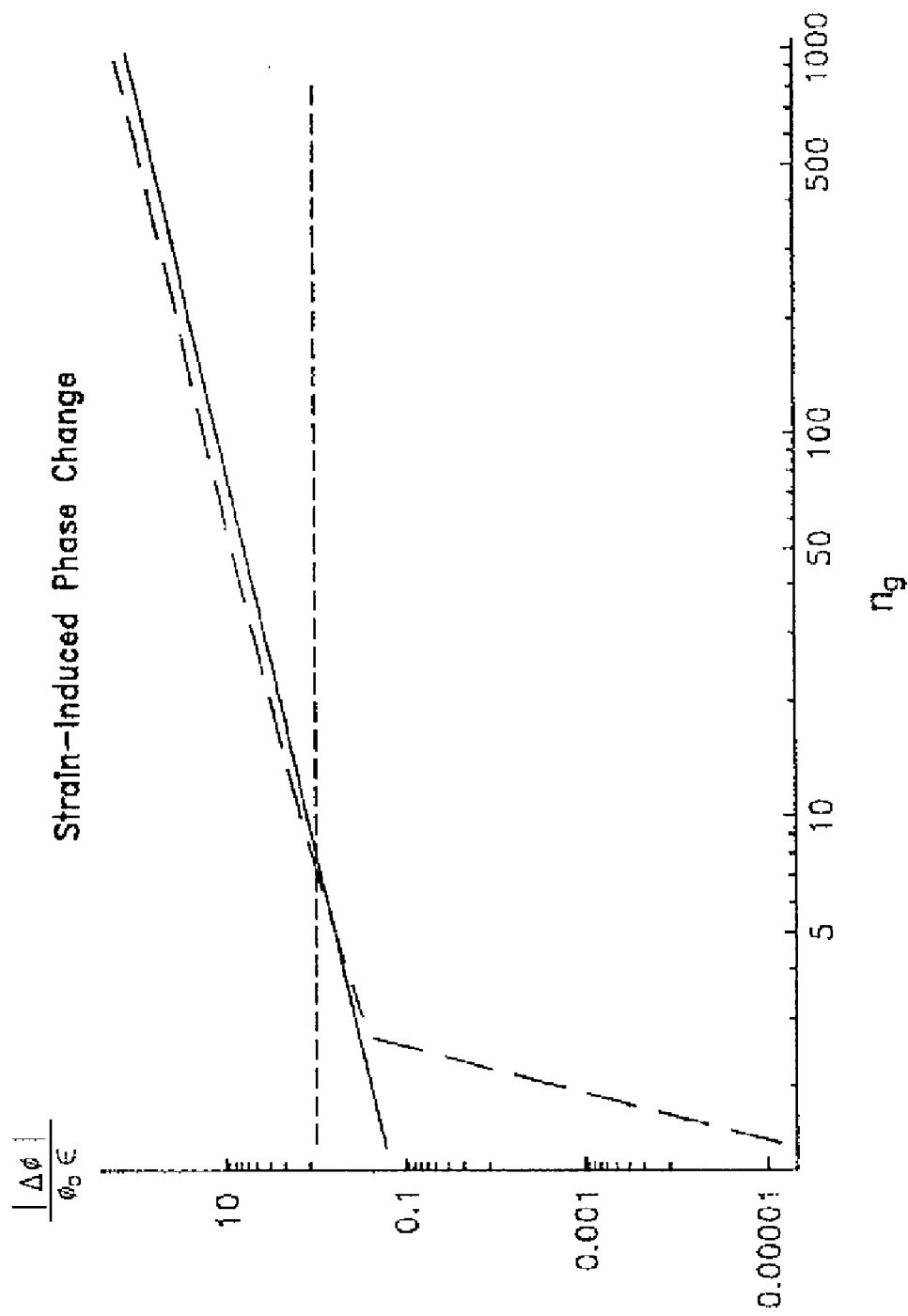
FIG. 11 is a plot of the calculated normalized phase changes due to changing the strain in the solid-core fiber of FIG. 10.

FIG. 11 plots the normalized phase changes that result from changing the strain applied to the same fiber as used for FIG. 10. The solid curve is the phase change caused by the elasto-optic effect, the dashed curve is due to changes in transverse dimension of the fiber, and the dotted curve is the phase change from the longitudinal expansion of the fiber. To compare the various effects on a log-log scale, the absolute value of each phase change is plotted, although they do not all have the same sign. As was shown for the thermal phase sensitivity plotted in FIG. 10, the terms plotted in FIG. 11 which are due to change in index and transverse dimension also exhibit enhancement with increasing $n_g$ when $n_g$ is large.

Figure 12:
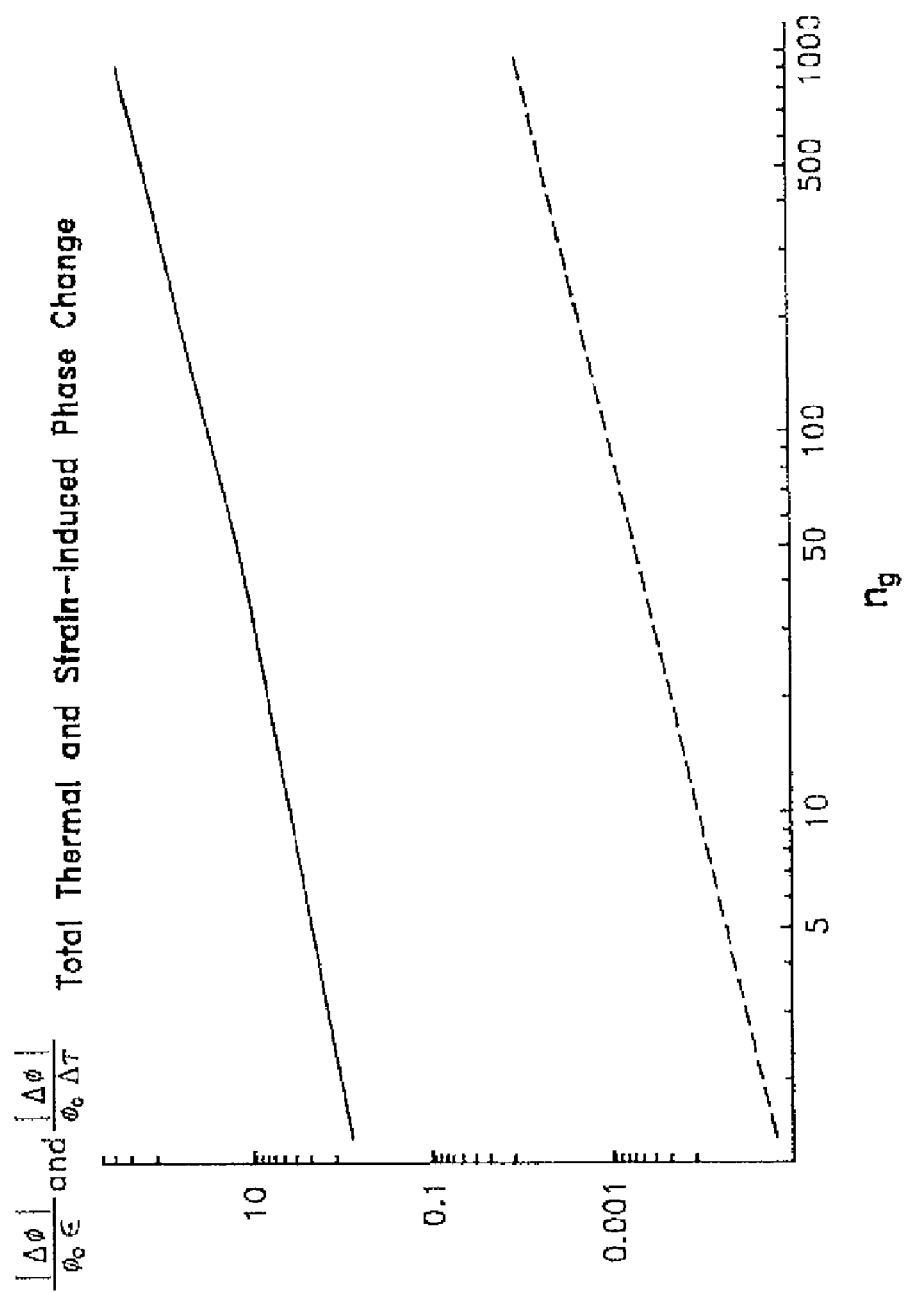
FIG. 12 is a plot that compares the strain and thermal sensitivities of the solid-core fiber of FIG. 10 as its group index is varied.
Figure 13:
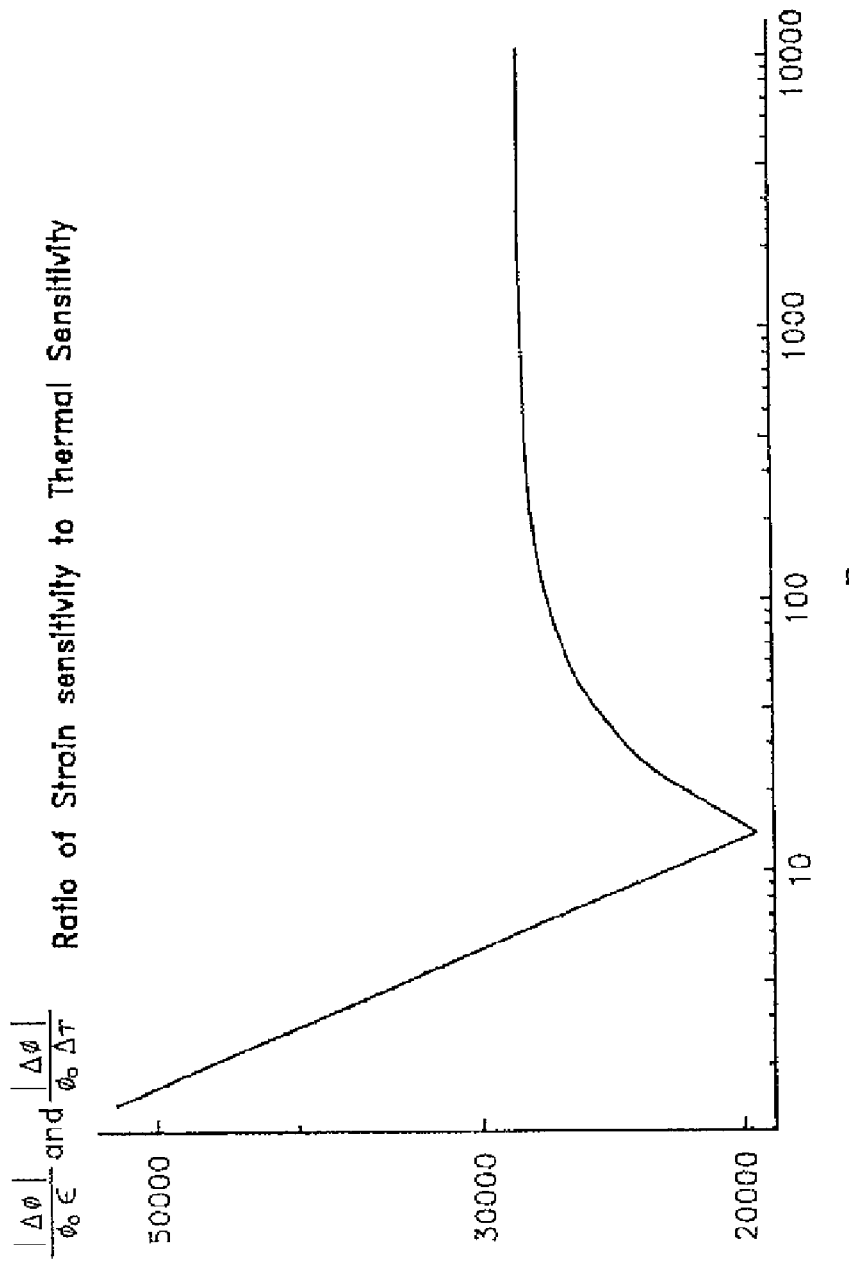
FIG. 13 is a plot of the ratio of the phase sensitivity to changes of strain and temperature for the solid-core fiber of FIG. 10.

FIG. 12 is a plot that compares the strain and thermal sensitivities of the solid-core fiber as its group index is allowed to vary. Both the strain response (solid line) and the temperature response (dashed line) show increasing sensitivity as the group index is increased. FIG. 13 is a plot of the ratio of the phase sensitivities to strain and to temperature. As shown in FIG. 13, the ratio of strain to thermal sensitivity is minimized for $n_g$ between about 10 and 11, and the ratio of the two sensitivities becomes constant as $n_g$ gets larger than this range (slower light), since the terms proportional to $n_g$ dominate. This calculation was made with regard to an idealized, homogeneous solid-core fiber, however it illustrates the general phenomenon of a range of values of the group index where the slow-light enhancement of the strain sensitivity of the optical sensor is reduced as compared to the slow-light enhancement of the temperature sensitivity of the optical sensor. In certain embodiments, the group index is selected to provide a predetermined ratio of the strain sensitivity to the temperature sensitivity.

For example, as shown in FIGS. 12 and 13, for a strain sensor having a solid-core fiber ($\sigma=1$), no value of $n_g$ causes the strain sensitivity to be greatly increased over the thermal sensitivity. Therefore, in certain embodiments, a strain sensor having a solid-core fiber advantageously has a low group index. For a temperature sensor, however, the reverse is true: the thermal sensitivity is greatest compared to the strain sensitivity for $n_g$ between 10 and 11. In this range of group indices, the temperature sensor advantageously has a reduced sensitivity to strain. Therefore, in certain embodiments, a temperature sensor having a solid-core fiber advantageously has a group index between 10 and 11. Air-core fibers, including air-core Bragg fibers, are expected to exhibit similar behavior (although the actual group index values will be different than those discussed above with regard to solid-core fibers) such that the group index can be selected to provide a predetermined ratio of the strain sensitivity to the temperature sensitivity.

Among the fiber sensors identified herein as having a sensitivity (to a particular measurand) that is enhanced by slow light, at least some, if not all, of them also have a sensitivity to temperature that is enhanced by slow light. This feature can be accounted for in the design and fabrication of the optical sensor to tailor the optical sensor for the particular measurand. In certain embodiments, an optical sensor having a first sensitivity to changes of a first measurand (e.g., strain) and a second sensitivity to changes of a second measurand (e.g., temperature) is fabricated. The method comprises providing an optical waveguide through which light is configured to propagate with a group velocity and a phase velocity, the group velocity less than the phase velocity. A first enhancement of the first sensitivity and a second enhancement of the second sensitivity are both dependent on the group index of the optical waveguide. The method further comprises selecting the group index such that the first enhancement is greater than the second enhancement.

In certain embodiments, an optical sensor using slow light to enhance the sensitivity to a measurand other than temperature advantageously corrects or otherwise reduces the effects of the increase in temperature sensitivity using one of the many existing techniques (e.g., maintaining a stable temperature of the optical sensor, particularly of the optical waveguide through which the slow light propagates) or techniques to be developed. For example, in certain embodiments of a strain fiber sensor using a solid-core fiber with a group index larger than about 10-11, the sensitivity to strain increases with the slowness of light in the same way as does the sensitivity to temperature. Although this dependence on temperature is not beneficial, it can be corrected or otherwise reduces the effect by using available techniques, and the increased sensitivity to strain can be extremely beneficial.

Conversely, in certain other embodiments, a very sensitive temperature sensor with a slow-light fiber can beneficially be made. For example, the optical sensor of certain embodiments uses a solid-core fiber which has a group index between approximately 10 and 11, thereby increasing the sensitivity to temperature with comparatively reduced strain sensitivity. In certain such embodiments, it is desirable to control the effects of strain, since sensitivity to strain would also be enhanced, using one of the many existing techniques (e.g., mounting the optical sensor, particularly the portion of the optical sensor through which the slow light propagates, on a material having a low coefficient of thermal expansion so that induced changes of strain are reduced) or techniques to be developed.

Various embodiments have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined by the claims.

What is claimed is:

1. An optical sensor comprising:
   at least one optical coupler;
   an optical waveguide comprising a plurality of loops, the optical waveguide in optical communication with the at least one optical coupler and mechanically decoupled from the at least one optical coupler such that the at least one optical coupler and the optical waveguide can be moved relative to one another with a rotation of the optical waveguide about an axis of symmetry of the plurality of loops, the coiled optical waveguide configured to receive a first optical signal from the at least one optical coupler, wherein the first optical signal has a group velocity and a phase velocity while propagating through at least a portion of the optical waveguide, the group velocity less than the phase velocity, wherein an interference between the first optical signal and a second optical signal is affected by the rotation of the optical waveguide about the axis of symmetry; and
   an optical detector configured to detect interference between the first optical signal and the second optical signal.

2. The optical sensor of claim 1, wherein the interference has a sensitivity to the relative movement which is dependent on the group velocity.

3. The optical sensor of claim 1, wherein the optical waveguide comprises a Bragg fiber.

4. The optical sensor of claim 1, wherein the optical waveguide comprises a photonic-bandgap fiber.

5. The optical sensor of claim 1, wherein the optical waveguide comprises a hollow-core optical fiber.

6. The optical sensor of claim 1, wherein the optical waveguide comprises a solid-core optical fiber.

7. The optical sensor of claim 1, wherein the group velocity is less than 50% of the speed of light in vacuum.

8. The optical sensor of claim 1, wherein the group velocity is less than 20% of the speed of light in vacuum.

9. The optical sensor of claim 1, wherein the interference is indicative of a rate of rotation of the optical waveguide.

10. The optical sensor of claim 1, wherein the at least one optical sensor comprises a first optical coupler and a second optical coupler, and the first optical signal comprises a first portion of an optical signal received by the first optical coupler.

11. The optical sensor of claim 10, further comprising a light source in optical communication with the first optical coupler, the light source configured to provide the optical signal to the first optical coupler.

12. The optical sensor of claim 10, wherein the second optical signal comprises a second portion of the optical signal received by the first optical coupler.

13. The optical sensor of claim 12, further comprising a second optical waveguide configured to receive the second optical signal, the optical waveguide in optical communication with the second optical coupler, the second optical waveguide in optical communication with the second optical coupler, wherein the second optical coupler is configured to receive the first optical signal and the second optical signal.

14. The optical sensor of claim 13, wherein the optical detector is in optical communication with the second optical coupler, the optical detector configured to detect interference between the first and second optical signals.

15. An optical sensor comprising:
at least one optical coupler;
an optical waveguide comprising a plurality of loops, the optical waveguide configured to receive a first optical signal and a second optical signal from the at least one optical coupler and mechanically decoupled from the at least one optical coupler such that the at least one optical coupler and the optical waveguide can be moved relative to one another with a rotation of the optical waveguide along a first direction about an axis of symmetry of the plurality of loops, wherein light propagates through at least a portion of the optical waveguide with a group velocity and a phase velocity, the group velocity less than the phase velocity, wherein, while the optical waveguide rotates along the first direction about the axis of symmetry, the first optical signal propagates through the optical waveguide in the first direction and the second optical signal propagates through the optical waveguide in a second direction generally opposite to the first direction, wherein an interference between the first optical signal and the second optical signal is affected by the rotation of the optical waveguide along the first direction about the axis of symmetry; and
an optical detector configured to detect interference between the first optical signal and the second optical signal.

16. The optical sensor of claim 15, wherein the group velocity is less than 50% of the speed of light in vacuum.

17. The optical sensor of claim 15, wherein the interference has a sensitivity to the rotation which is inversely proportional to the group velocity.

18. An optical sensor comprising:
a fiber coupler configured to receive light from a light source and to transmit light to a light detector; and
a fiber coil optically coupled to the fiber coupler and mechanically decoupled from the fiber coupler such that the fiber coupler and the fiber coil can be moved relative to one another with a rotation of one of the fiber coil and the fiber coupler about an axis of symmetry of the fiber coil such that a first optical pathlength between a first portion of the fiber coil and the fiber coupler increases and a second optical pathlength between a second portion of the fiber coil and the fiber coupler decreases, at least a portion of the fiber coil comprising an optical fiber through which light propagates with a group velocity and a phase velocity, the group velocity less than the phase velocity, wherein a first portion of the light received by the fiber coupler from the light source propagates from the fiber coupler, through the fiber coil in a first direction, and back to the fiber coupler and a second portion of the light received by the fiber coupler from the light source propagates from the fiber coupler, through the fiber coil in a second direction opposite to the first direction, and back to the fiber coupler, the first portion of the light and the second portion of the light propagating to the light detector and interfering with one another, wherein the interference between the first portion of the light and the second portion of the light is indicative of the rotation.

19. The optical sensor of claim 18, wherein the fiber coil is configured to rotate about a direction generally perpendicular to the fiber coil with a rotation rate, the interference indicative of the rotation rate.

20. The optical sensor of claim 19, wherein the fiber coupler comprises a prism coupler.

21. The optical sensor of claim 19, wherein the rotation of the fiber coil is less than 20 degrees.

22. The optical sensor of claim 18, wherein the first portion of the fiber coil comprises a first end of the fiber coil and the second portion of the fiber coil comprises a second end of the fiber coil.

23. The optical sensor of claim 22, wherein the fiber coupler comprises a first port and a second port, the first port optically coupled to the first end of the fiber coil and the second port optically coupled to the second end of the fiber coil.

24. The optical sensor of claim 23, further comprising a first gap between the first port and the first end such that optical signals traveling between the first port and the first end propagate in free space.

25. The optical sensor of claim 24, further comprising a second gap between the second port and the second end such that optical signals traveling between the second port and the second end propagate in free space.

26. The optical sensor of claim 23, further comprising a first lengthwise stretchable optical waveguide between the first port and the first end.

27. The optical sensor of claim 26, further comprising a second lengthwise stretchable optical waveguide between the second port and the second end.

28. The optical sensor of claim 18, wherein the optical fiber comprises a Bragg fiber.

29. The optical sensor of claim 18, wherein the optical fiber comprises a photonic-bandgap fiber.

30. The optical sensor of claim 18, wherein the group velocity is less than 50% of the speed of light in vacuum.

31. The optical sensor of claim 18, wherein the interference has a sensitivity to the rotation which is dependent on the group velocity.

* * * * *

UNITED STATES PATENT AND TRADEMARK OFFICE
CERTIFICATE OF CORRECTION

PATENT NO. : 8,300,231 B2  
APPLICATION NO. : 13/026049  
DATED : October 30, 2012  
INVENTOR(S) : Terrel et al.

Page 1 of 1

It is certified that error appears in the above-identified patent and that said Letters Patent is hereby corrected as shown below:

In the Specifications

In column 13 at line 25, Change "a" to --σ--.

In the Claims

In column 16 at line 41, In Claim 1, change "coiled optical" to --optical--.

Signed and Sealed this  
Second Day of July, 2013

Teresa Stanek Rea  
*Acting Director of the United States Patent and Trademark Office*